(12) United States Patent
Mori et al.

(10) Patent No.: US 10,484,953 B2
(45) Date of Patent: Nov. 19, 2019

(54) WIRELESS COMMUNICATION DEVICE AND WIRELESS COMMUNICATION METHOD

(71) Applicant: SONY CORPORATION, Tokyo (JP)

(72) Inventors: Masahito Mori, Kanagawa (JP); Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 24 days.

(21) Appl. No.: 15/741,618

(22) PCT Filed: Jun. 10, 2016

(86) PCT No.: PCT/JP2016/067444
§ 371 (c)(1),
(2) Date: Jan. 3, 2018

(87) PCT Pub. No.: WO2017/043136
PCT Pub. Date: Mar. 16, 2017

(65) Prior Publication Data
US 2018/0199295 A1    Jul. 12, 2018

(30) Foreign Application Priority Data

Sep. 8, 2015  (JP) ............................... 2015-176846

(51) Int. Cl.
*H04W 52/38* (2009.01)
*H04W 52/24* (2009.01)
(Continued)

(52) U.S. Cl.
CPC ........... *H04W 52/38* (2013.01); *H04W 52/00* (2013.01); *H04W 52/242* (2013.01);
(Continued)

(58) Field of Classification Search
CPC . H04W 84/12; H04W 52/262; H04W 52/283; H04W 52/38; H04W 52/00; H04W 52/242; H04W 52/04
See application file for complete search history.

(56) References Cited

U.S. PATENT DOCUMENTS

2005/0105504 A1   5/2005  Sakoda
2005/0143119 A1*  6/2005  Chandra ............. H04W 52/288
                                                   455/522
(Continued)

FOREIGN PATENT DOCUMENTS

JP    2008-252867 A   10/2008
JP    2010-109939 A    5/2010
(Continued)

OTHER PUBLICATIONS

Wang, et al., "Effects of Location Awareness on Concurrent Transmissions for cognitive Ad Hoc Networks Overlaying Infrastructure-Based Systems", IEEE Transactions on Mobile Computing, vol. 8, May 2009, pp. 577-589.

(Continued)

*Primary Examiner* — Keith Ferguson
(74) *Attorney, Agent, or Firm* — Xsensus LLP

(57) ABSTRACT

[Object] To provide a mechanism capable of improving use efficiency of communication resources during a transmission period of a wireless communication device belonging to another wireless communication network.
[Solution] A wireless communication device including: a communication unit configured to receive a physical layer (PHY) header including modulation scheme information from a first wireless communication device belonging to a first wireless communication network different from a second wireless communication network to which a self-device belongs; and a control unit configured to control transmis- (Continued)

sion power on a basis of information obtained in reception of the PHY header, and a wireless communication method.

15 Claims, 12 Drawing Sheets

(51) Int. Cl.
  *H04W 52/26* (2009.01)
  *H04W 52/34* (2009.01)
  *H04W 52/00* (2009.01)
  *H04W 84/12* (2009.01)

(52) U.S. Cl.
  CPC ....... *H04W 52/243* (2013.01); *H04W 52/247* (2013.01); *H04W 52/262* (2013.01); *H04W 52/34* (2013.01); *H04W 84/12* (2013.01)

(56) References Cited

U.S. PATENT DOCUMENTS

| 2008/0009306 | A1* | 1/2008 | Suga | H04W 52/10 |
| | | | | 455/522 |
| 2010/0003926 | A1* | 1/2010 | Sahara | H04W 28/18 |
| | | | | 455/68 |
| 2013/0235859 | A1* | 9/2013 | Sun | H04W 48/08 |
| | | | | 370/338 |
| 2014/0328191 | A1 | 11/2014 | Barriac et al. | |
| 2014/0378150 | A1 | 12/2014 | Li et al. | |
| 2015/0124744 | A1 | 5/2015 | Zhu et al. | |

FOREIGN PATENT DOCUMENTS

| JP | 2014-183486 A | 9/2014 |
| JP | 2015-506130 A | 2/2015 |
| WO | 2004/071021 A1 | 8/2004 |

OTHER PUBLICATIONS

IEEE Std 802.11a-1999 (R2003). "Supplement to IEEE Standard for Information technology—Telecommunications and information exchange between systems—Local and metropolitan area networks—Specific requirements, Part 11: Wireless LAN Medium Access Control (MAC) and Physical Layer (PHY) specifications, High-speed Physical Layer in the 5 GHz Band", 1999, reaffirmed Jun. 12, 2003, Total 9 pages.

International Search Report dated Jul. 5, 2016 in PCT/JP2016/067444 filed Jun. 10, 2016.

Extended European Search Report dated Feb. 11, 2019 in European Appiication No. 16844002.2-1214.

* cited by examiner

WIRELESS COMMUNICATION DEVICE AND WIRELESS COMMUNICATION METHOD

TECHNICAL FIELD

The present disclosure relates to a wireless communication device and a wireless communication method.

BACKGROUND ART

In recent years, wireless local area networks (LANs) have spread with development of communication technologies. In addition, with the wireless LANs, products corresponding to the wireless LANs (hereinafter also referred to as wireless communication devices) have also increased. When wireless communication devices increase, there is a high possibility of communication efficiency deteriorating. Therefore, it is desirable to improve the communication efficiency.

One reason for deteriorating communication efficiency of wireless communication is collision of frames (packets). For example, when a plurality of wireless communication devices simultaneously transmit frames, frames collide. Thus, there is a low possibility of the frames being successfully received. As a result, the colliding frames are retransmitted, thereby deteriorating communication efficiency.

In contrast, the Institute of Electrical and Electronics Engineers (IEEE) 802.11 standard provides a mechanism such as a request to send (RTS)/clear to send (CTS) scheme. Specifically, when a wireless communication device of a data transmission source transmits an RTS frame as a data transmission request and receives a CTS frame as a confirmation notification from a wireless communication device of a data transmission destination, data transmission starts. On the other hand, a wireless communication device receiving at least one of the RTS frame and the CTS frame sets a transmission stop period in which transmission of the self-device stops only for a data transmission period based on an RTS/CTS procedure. For example, the transmission stop period is called a network allocation vector (NAV) period. Thus, collision of frames is avoided.

In addition, Patent Literature 1 proposes the disclosure related to a scheme in which a change occurs in conformity with the RTS/CTS scheme. Specifically, when a wireless communication device receives an RTS frame, the wireless communication device sets NAV1 on the basis of a legacy-signal (L-SIG) duration. Then, in a case in which a frame from a transmission source of the RTS frame is not detected within a period in which a predetermined period is added to NAV1, the wireless communication device cancels NAV2 based on a media access control (MAC) duration and starts transmission.

CITATION LIST

Patent Literature

Patent Literature 1: JP 2008-252867A

DISCLOSURE OF INVENTION

Technical Problem

However, in the RTS/CTS scheme of the related art and the disclosure of Patent Literature 1, communication efficiency can be prevented from deteriorating due to collision of frames (signals), but it is difficult to improve use efficiency of communication resources within a transmission stop period. For example, in the related art, transmission of signals received from wireless communication devices belonging to another wireless communication network (for example, a basic service set (BSS) or the like) is also stopped uniformly because a wireless communication device receiving the signals sets an NAV period. Accordingly, the transmission stops even in a case in which transmission of the self-device does not disturb communication of the other BSS. Therefore, it is difficult to utilize communication resources during the transmission stop period.

Accordingly, the present disclosure proposes a mechanism capable of improving use efficiency of communication resources during a transmission period of a wireless communication device belonging to another wireless communication network.

Solution to Problem

According to the present disclosure, there is provided a wireless communication device including: a communication unit configured to receive a physical layer (PHY) header including modulation scheme information from a first wireless communication device belonging to a first wireless communication network different from a second wireless communication network to which a self-device belongs; and a control unit configured to control transmission power on a basis of information obtained in reception of the PHY header.

In addition, according to the present disclosure, there is provided a wireless communication device including: a communication unit configured to transmit a physical layer (PHY) header including modulation scheme information, the PHY header being used to control transmission power in a second wireless communication device belonging to a second wireless communication network different from a first wireless communication network to which a self-device belongs.

In addition, according to the present disclosure, there is provided a wireless communication device including: a communication unit configured to transmit a signal including modulation scheme information, the signal being used to control transmission power in a second wireless communication device belonging to a second wireless communication network different from a first wireless communication network to which a self-device belongs.

In addition, according to the present disclosure, there is provided a wireless communication method including: receiving, by a communication unit, a physical layer (PHY) header including modulation scheme information from a first wireless communication device belonging to a first wireless communication network different from a second wireless communication network to which a self-device belongs; and controlling, by a control unit, transmission power on a basis of information obtained in reception of the PHY header.

Advantageous Effects of Invention

According to the present disclosure, as described above, it is possible to provide a mechanism capable of improving use efficiency of communication resources during a transmission period of a wireless communication device belonging to another wireless communication network. Note that the effects described above are not necessarily limitative. With or in the place of the above effects, there may be

MODE(S) FOR CARRYING OUT THE INVENTION

Figure 1:
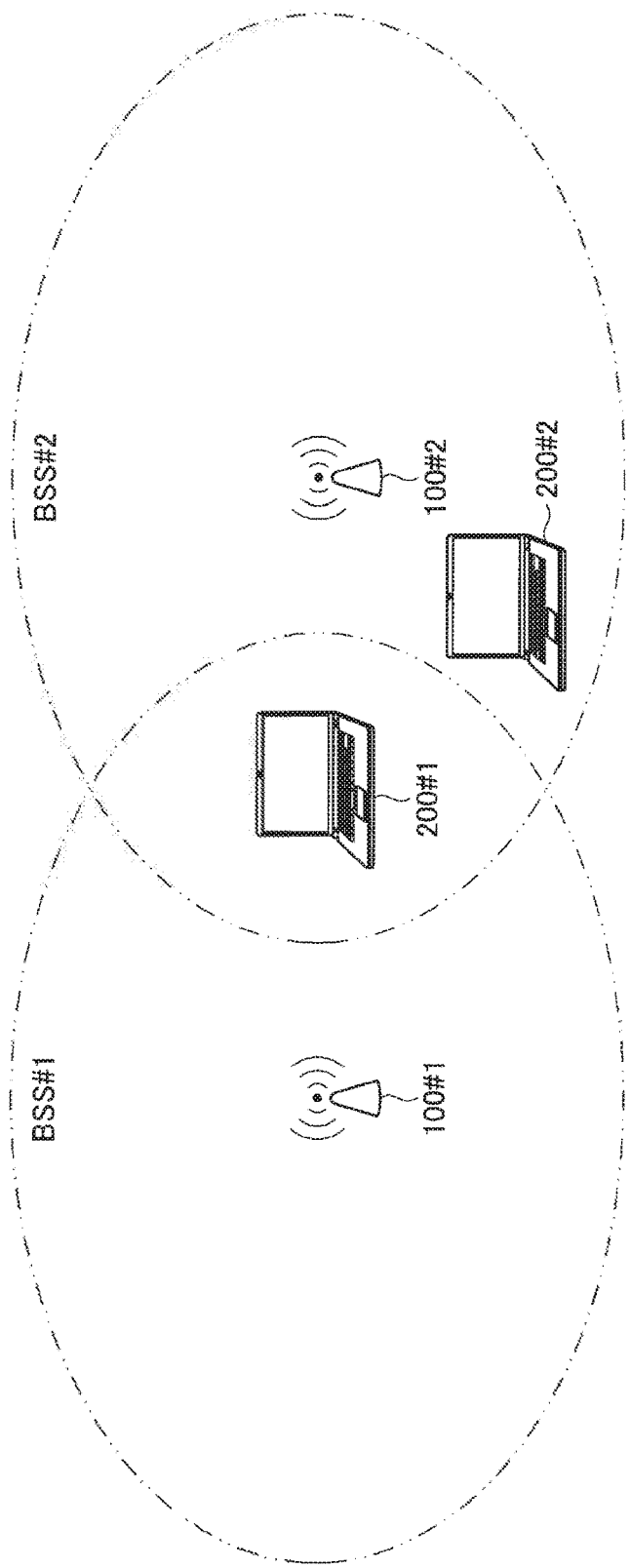
FIG. 1 is a diagram illustrating a configuration example of a wireless communication system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, there are also cases in which a plurality of components having substantially the same function and structure are distinguished by adding different numbers to the end of the same reference numeral. For example, a plurality of components having substantially the same function are distinguished as necessary like an AP 100 #1 and an AP 100 #2. However, in a case where it is unnecessary to distinguish components having substantially the same function and structure, only the same reference numeral is added. For example, in a case where it is unnecessary to particularly distinguish the AP 100 #1 and the AP 100 #2, they are referred to as simply as an "AP 100."

Moreover, the description will be made in the following order.

1. Overview of wireless communication device according to embodiment of the present disclosure
2. First embodiment of the present disclosure
   2-1. Basic functional configuration of device
   2-2. Details of function of device
   2-3. Process of device
   2-4. Conclusion of first embodiment
3. Second embodiment of the present disclosure (case in which signal is not received from AP of another BSS)
   3-1. Details of function of device
   3-2. Conclusion of second embodiment
4. Third embodiment of the present disclosure (case in which signal is received from AP of another BSS)
   4-1. Details of function of device
   4-2. Conclusion of second embodiment
5. Application examples
6. Conclusion

1. OVERVIEW OF WIRELESS COMMUNICATION DEVICE ACCORDING TO EMBODIMENT OF THE PRESENT DISCLOSURE

First, an overview of a wireless communication system according to an embodiment of the present disclosure will be described with reference to FIG. 1. FIG. 1 is a diagram illustrating a configuration example of the wireless communication system according to the embodiment of the present disclosure.

The wireless communication system according to the embodiment of the present disclosure includes a wireless communication device operating as an access point (AP) (hereinafter also simply referred to as an AP) and a wireless communication device operating as a station (STA) (hereinafter also simply referred to as an STA). The AP and the STA are connected to each other so that a wireless communication network is formed by the connection. In addition, the STA has a function of stopping transmission of the self-device during a transmission period of another STA. For example, the transmission stop period is an NAV period.

For example, as illustrated in FIG. 1, the wireless communication system includes AP 100 #1 and STA 200 #1. AP 100 #1 and STA 200 #1 are connected to each other to form a wireless communication network in a unit called a basic service set (BSS) #1. In addition, although not illustrated in FIG. 1 for simplicity, a plurality of STAs 200 #1 are connected to AP 100 #1 in some cases. In this case, while a certain STA 200 #1 is executing transmission to AP 100 #1, another STA 200 #1 stops transmission of the self-device during an NAV period. Then, after the transmission of the certain STA 200 #1 ends, the other STA 200 #1 starts the transmission.

Here, in a case in which a plurality of APs are installed, communication ranges of the APs overlap each other. For example, as illustrated in FIG. 1, a communication range of AP 100 #1, that is, a range of BSS #1 which may be connected to AP 100 #1, overlaps a communication range of AP 100 #2, that is, a range of BSS #2. Such an environment is called an overlapping BSS (OBSS) environment.

In the OBSS environment, there is a possibility of a signal transmitted by an STA being received by an AP of another BSS different from the BSS to which the STA belongs. Therefore, when a signal is received from another STA, the STA stops transmission of the self-device because a transmission period of the signal is an NAV period despite the fact that the other STA is an STA of the other BSS. As a result, transmission opportunities of an STA under the OBSS environment decrease, and thus use efficiency of communication resources may deteriorate.

Accordingly, the present disclosure proposes a wireless communication device (STA 200) that receives a physical layer (PHY) header (or a physical layer convergence protocol (PLCP) header) including modulation scheme information from a first wireless communication device belonging to a first wireless communication network different from a second wireless communication network to which the self-device belongs, and controls transmission power on the basis of information included in the PHY header.

For example, when a signal is received from an STA belonging to another BSS, an STA 200 acquires the modulation scheme information included in the PHY header of the signal. Specifically, when a signal transmitted from STA 200 #1 belonging to BSS #1 is received, STA 200 #2 belonging to BSS #2 as illustrated in FIG. 1 acquires MCS information included in the PHY header of the received signal.

Subsequently, the STA 200 decides allowed transmission power of the self-device (hereinafter also referred to as allowance transmission power) on the basis of the acquired modulation scheme information. For example, STA 200 #2 decides allowance transmission power of the self-device on the basis of the MCS information.

Subsequently, the STA 200 transmits a signal of the self-device in a case in which transmission power requested from AP 100 #2 is equal to or less than the allowance transmission power. For example, even during a transmission period of STA 200 #1, STA 200 #2 transmits a signal with requested transmission power when the requested transmission power is equal to or less than the allowance transmission power.

In this way, the wireless communication device according to the embodiment of the present disclosure receives the PHY header including the modulation scheme information from the first wireless communication device belonging to the first wireless communication network different from the second wireless communication network to which the self-device belongs, and controls the transmission power on the basis of the information included in the PHY header. Therefore, even under the OBSS environment in which a signal is received from a wireless communication device of another BSS, a self-device can execute communication without disturbing communication in the other BSS. Accordingly, it is possible to improve use efficiency of communication resources under the OBSS environment. Hereinafter, the detailed description thereof will be made.

Moreover, to facilitate the description, devices such as STAs 200 according to first to third embodiments are distinguished from each other by suffixing numbers corresponding to the embodiments, as in STA 200-1 to STA 200-3. In FIG. 1, the example in which the wireless communication system includes both the AP 100 and the STA 200 has been described as an example of the wireless communication system. However, all the wireless communication devices may be STAs 200 and one of the STAs 200 may be a wireless communication device that has a plurality of direct links with other STAs 200. In this case, a downlink can be said to be "simultaneous transmission from one STA 200 to a plurality of STAs 200" and an uplink can be said to be "simultaneous transmission from a plurality of STAs 200 to one STA 200."

2. FIRST EMBODIMENT OF THE PRESENT DISCLOSURE

The overview of the wireless communication device according to the embodiment of the present disclosure has been described above. Next, an AP 100-1 and an STA 200-1 (hereinafter also referred to as a wireless communication device 100-1 (200-1)) according to a first embodiment of the present disclosure will be described.

2-1. Basic Functional Configuration of Device

Figure 2:
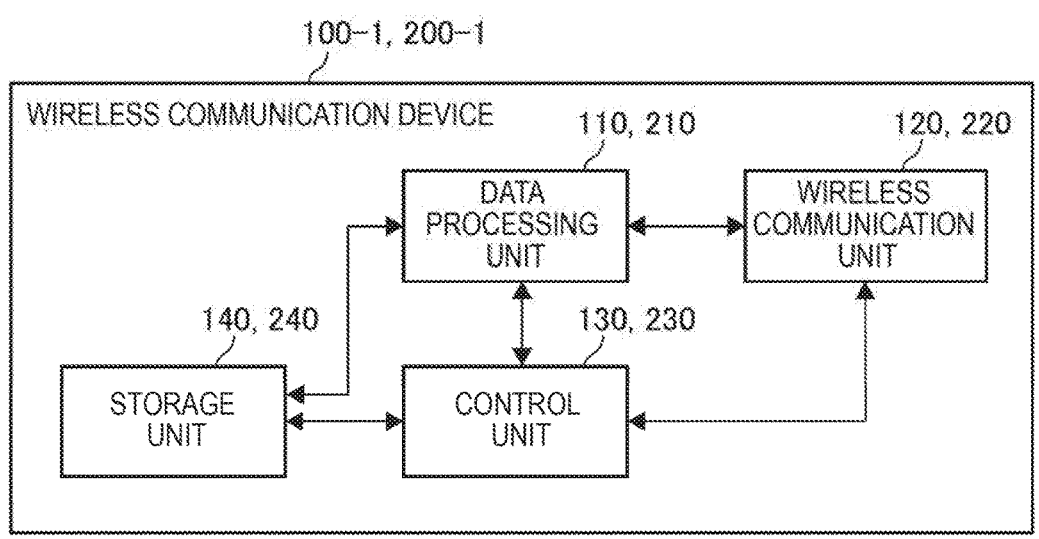
FIG. 2 is a block diagram illustrating an example of an overall functional configuration of a wireless communication device according to a first embodiment of the present disclosure.

First, a basic functional configuration of the wireless communication device 100-1 (200-1) according to the first embodiment of the present disclosure will be described with reference to FIG. 2. FIG. 2 is a block diagram illustrating an example of an overall functional configuration of the wireless communication device 100-1 (200-1) according to the first embodiment of the present disclosure.

The wireless communication device 100-1 (200-1) includes a data processing unit 110 (210), a wireless communication unit 120 (220), a control unit 130 (230), and a storage unit 140 (240), as illustrated in FIG. 2. Moreover, the data processing unit 110 (210) and the wireless communication unit 120 (220) are also collectively referred to as a communication unit.

The data processing unit 110 (210) serving as a part of the communication unit executes a process of transmitting and receiving data. Specifically, the data processing unit 110 (210) generates a frame on the basis of data from a higher communication layer and supplies the generated frame to the wireless communication unit 120 (220). For example, the data processing unit 110 (210) executes processes of generating a frame (packet) from data and executing addition of a media access control (MAC) header for MAC, addition of an error detection code, and the like to the generated frame. In addition, the data processing unit 110 (210) extracts data from a received frame and supplies the extracted data to a higher communication layer. For example, the data processing unit 110 (210) acquires data by executing analysis of the MAC header, detection and correction of a code error, a reordering process, and the like on the received frame.

The wireless communication unit 120 (220) serving as a part of the communication unit includes a signal processing function and a wireless interface function.

The signal processing function is a function of executing signal processing such as modulation on a frame. Specifically, the wireless communication unit 120 (220) generates a symbol stream by encoding, interleaving, and modulating a frame supplied from the data processing unit 110 (210) in conformity with coding and modulation schemes or the like set by the control unit 130 (230) and adding a preamble and a PHY header. In addition, the wireless communication unit 120 (220) acquires a frame by executing demodulation, decoding, and the like on the symbol stream acquired through the process of the wireless interface function and supplies the acquired frame to the data processing unit 110 (210) or the control unit 130 (230).

The wireless interface function is a function of transmitting and receiving a signal through an antenna. Specifically, the wireless communication unit 120 (220) converts a signal related to the symbol stream obtained through the process of the signal processing function into an analog signal and executes amplification, filtering, and frequency up-conversion on the analog signal. Then, the wireless communication unit 120 (220) transmits the processed signal via the antenna. In addition, the wireless communication unit 120 (220) executes reverse processes to the processes at the time of transmission of the signal, for example, frequency down-conversion, digital signal conversion, and the like, on a signal obtained from the antenna.

The control unit 130 (230) performs general control of the operation of the wireless communication device 100-1 (200-1). Specifically, the control unit 130 (230) exchanges information between functions and executes a process such as communication parameter setting and scheduling of frames in the data processing unit 110 (210).

The storage unit 140 (240) stores information to be used in a process of the data processing unit 110 (210) or the control unit 130 (230). Specifically, the storage unit 140 (240) stores information stored in a transmission frame, information acquired from a received frame, communication parameter information, and the like.

2-2. Details of Function of Device

Next, functional details of the wireless communication device 100-1 (200-1) according to the first embodiment of the present disclosure will be described. Hereinafter, AP 100-1 #1 belonging to BSS #1, STA 200-1 #1 transmitting the above-described PHY header, AP 100-1 #2 belonging to BSS #2, and STA 200-1 #2 receiving the PHY header will be separately described.

(Function of AP #1)

First, functional details of AP 100-1 #1 serving as a first destination wireless communication device will be described.

AP 100-1 #1 transmits a signal including modulation scheme information to STA 200-1 #1. In addition, the signal includes request transmission power information and information in which allowance of another signal for signal reception in the self-device is specified (hereinafter also referred to as allowance signal information). Specifically, in a case in which transmission of STA 200-1 #1 is permitted, the control unit 130 generates modulation scheme information indicating a modulation scheme, request transmission power information indicating transmission power, and the allowance signal information which are caused to be used by STA 200-1 #1. Then, the communication unit transmits a signal including the generated modulation scheme information, request transmission power information, and allowance signal information (hereinafter also referred to as trigger notification information) (hereinafter also referred to as a trigger signal) to STA 200-1 #1.

For example, the modulation scheme information is modulation and coding set (MCS) information. In addition, the allowance signal information includes the degree of interference by another signal to be allowed (hereinafter also referred to as an allowance interference level) or the degree of reception power of another signal to be allowed (hereinafter also referred to as a reception power allowable degree). Moreover, the trigger notification information includes, for example, a PHY header, a MAC header, or a payload. In addition, the trigger notification information may be generated whenever transmission to STA 200-1 #1 is permitted. In addition, a trigger signal including the trigger notification information may include a BSS identifier of the self-device.

In addition, AP 100-1 #1 receives a signal which is a response to the trigger signal from STA 200-1 #1. Specifically, after transmitting the trigger signal, AP 100-1 #1 receives a response signal to be described below from STA 200-1 #1.

(Function of STA #1)

Next, functional details of STA 200-1 #1 serving as the first wireless communication device will be described.

STA 200-1 #1 receives the trigger signal including the trigger notification information from AP 100-1 #1. Specifically, when the trigger signal is received from AP 100-1 #1, the communication unit acquires the trigger notification information included in the trigger signal.

In addition, STA 200-1 #1 transmits the PHY header including the modulation scheme information. In addition, the PHY header includes the BSS identifier, the transmission power information, and the allowance signal information. Specifically, the control unit 230 sets a modulation scheme and transmission power as communication parameters used for transmission destined for AP 100-1 #1 on the basis of the modulation scheme information and the request transmission power information which are the acquired communication information. Then, the communication unit transmits the PHY header including the modulation scheme information regarding the set modulation scheme, the transmission power information regarding the set transmission power, the acquired allowance signal information, and the BSS identifier (hereinafter also referred to as response header information) and a signal including the frame (hereinafter also referred to as a response signal) with communication parameters to be set.

Moreover, transmission power set on the basis of the request transmission power information may be different from transmission power specified from the request transmission power information. For example, transmission power used for transmission of the PHY header, that is, transmission destined for AP 100-1 #1 may be different from transmission power specified from the request transmission power information within an allowed range. Moreover, in this case, the request transmission power information included in the PHY header is replaced with information in which the transmission power used for transmission of the PHY header is specified.

(Function of STA #2)

Next, functional details of STA 200-1 #2 serving as the second wireless communication device will be described.

(A. Reception of PHY Header)

STA 200-1 #2 receives a response signal from the foregoing STA 200-1 #1. Specifically, STA 200-1 #2 receives the PHY header including the modulation scheme information from STA 200-1 #1 belonging to BSS #1 different from BSS #2 to which the self-device belongs.

For example, when the PHY header is received, the communication unit acquires the response header information included in the PHY header, that is, the modulation scheme information, the transmission power information, the allowance signal information, and the BSS identifier. In addition, the communication unit sets a transmission stop period (NAV period) in regard to transmission of the STA which is the transmission source of the PHY header. Subsequently, the communication unit determines whether the acquired BSS identifier matches the BSS identifier of BSS #2 to which the self-device belongs. In a case in which it is determined that the acquired BSS identifier does not match the BSS identifier of the self-device, the communication unit supplies the acquired modulation scheme information, transmission power information, and allowance signal information to the control unit 230. Conversely, in a case in which it is determined that the acquired BSS identifier matches the BSS identifier of the self-device, the allowance transmission power may not be changed or may be set to a value that is lower as transmission is more difficult.

In addition, STA 200-1 #2 measures signal strength of the response signal. Specifically, the communication unit measures the signal strength of the received PHY header. For example, the communication unit measures a received signal strength indicator (RSSI) of the PHY header. Then, the value obtained through the measurement is supplied as reception power information to the control unit 230.

(B. Control of Transmission Power)

STA 200-1 #2 controls the transmission power on the basis of the information obtained by receiving the PHY header. Specifically, the control unit 230 decides the transmission power on the basis of an attenuation amount of radio waves related to a signal that it has transmitted. In addition, the attenuation amount is estimated on the basis of the information obtained by receiving the PHY header.

(B-1) Decision of Allowance Transmission Power

More specifically, the control unit 230 decides transmission power to be allowed (hereinafter also referred to as allowance transmission power) and decides transmission power of the self-device within a range equal to or less than the allowance transmission power.

Figure 3:
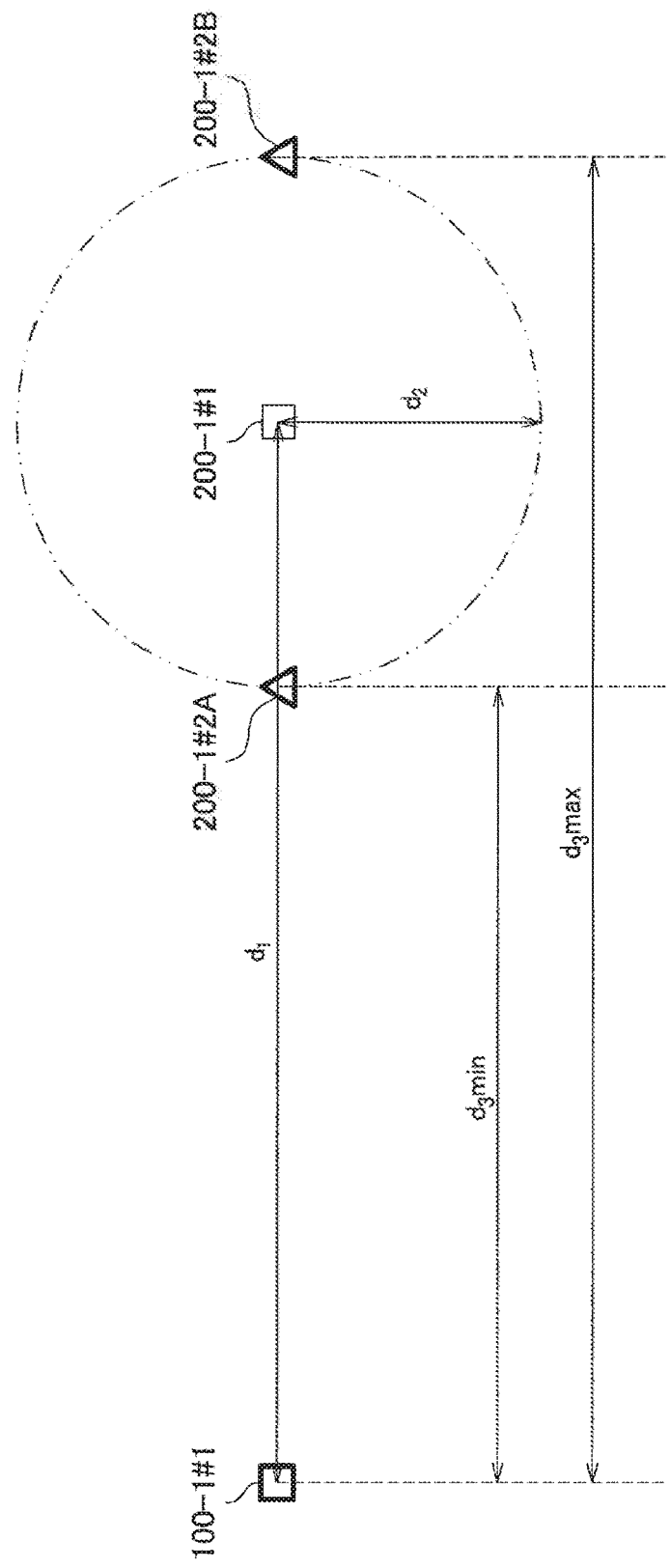
FIG. 3 is an explanatory diagram illustrating a process of controlling transmission power according to the embodiment.

For example, the attenuation amount is estimated on the basis of a distance $d_3$ between the self-device and AP 100-1 #1. The distance $d_3$ is estimated on the basis of the information obtained by receiving the PHY header. Moreover, the information obtained by receiving the PHY header includes at least one of the modulation scheme information, the transmission power information, and the allowance signal information included in the PHY header and reception signal strength in regard to the PHY header. Further, a process of controlling the transmission power will be described with reference to FIG. 3. FIG. 3 is an explanatory diagram illustrating the process of controlling the transmission power according to the embodiment. In FIG. 3, an example of a positional relation among devices is illustrated.

First, the control unit 230 calculates the distance $d_3$ between the self-device and AP 100-1 #1. Specifically, the distance $d_3$ includes a difference between a distance $d_1$ between STA 200-1 #1 and AP 100-1 #1 and a distance $d_2$ between the self-device and STA 200-1 #1.

For example, a case in which AP 100-1 #1 and STA 200-1 #1 are located, as illustrated in FIG. 3, and the self-device, that is, STA 200-1 #2 receives a response signal from STA 200-1 #1 will be considered. In this case, the self-device is located at any position on a circumference separated by the distance $d_2$ from STA 200-1 #1. When the self-device is located farthest away from AP 100-1 #1 on the circumference, a distance between AP 100-1 #1 and the self-device is $d_3max$, as illustrated in FIG. 3, and $d_3max$ is a sum of $d_1$ and $d_2$. In addition, when the self-device is located closest to AP 100-1 #1 on the circumference, a distance between AP 100-1 #1 and the self-device is $d_3min$, as illustrated in FIG. 3, and $d_3min$ is a difference between $d_1$ and $d_2$.

Here, to lower a possibility of an influence on communication of another BSS, the distance $d_{3min}$ is adopted as the distance between AP 100-1 #1 and the self-device. Accordingly, the control unit 230 calculates the distances $d_1$ and $d_2$ to calculate the distance $d_{3min}$.

First, calculation of the distance $d_1$ will be described. The control unit 230 calculates the distance $d_1$ on the basis of an attenuation amount of radio waves related to a signal transmitted from STA 200-1 #1 to AP 100-1 #1. Specifically, the control unit 230 calculates the distance $d_1$ on the basis of the transmission power information acquired from the PHY header and estimated reception signal strength in regard to a response signal in the AP 100-1 #1. For example, the distance $d_1$ is calculated from the following Expression (1).

[Math. 1]

$$d_1 = f_1(TxP_{STA\#1} - RxP_{STA\#1>AP\#1}) \quad (1)$$

In the foregoing Expression (1), $f_1$ indicates a function of calculating a distance from an attenuation amount. In addition, $TxP_{STA\#1}$ indicates transmission power of STA 200-1 #1. $RxP_{STA\#1>A\#1}$ indicates reception power of AP 100-1 #1 in regard to a signal received from STA 200-1 #1, for example, reception signal strength. Moreover, the function $f_1$ may be improved on the basis of a previous calculation result.

In addition, the control unit 230 estimates reception signal strength in regard to the response signal in AP 100-1 #1, the reception signal strength being substituted to the foregoing Expression (1). Specifically, the reception signal strength is estimated on the basis of a signal to interference ratio (SIR) and the allowance signal information. For example, the reception signal strength is calculated from the following Expression (2).

[Math. 2]

$$RxP_{AP\#1} = f_2(SIR_{AP\#1}, I_{AP\#1}) \quad (2)$$

In the foregoing Expression (2), $f_2$ indicates a function of calculating reception signal strength from the SIR and the allowance interference level. In addition, $SIR_{AP\#1}$ indicates an SIR in AP 100-1 #1. $I_{AP\#1}$ indicates an allowance interference level of AP 100-1 #1. Moreover, the function $f_2$ may be improved on the basis of a previous calculation result.

In addition, the control unit 230 estimates an SIR in regard to a response signal in AP 100-1 #1, the SIR being substituted to the foregoing Expression (2). Specifically, the SIR is estimated on the basis of the modulation scheme information and reception characteristics. An index indicating the reception characteristics is, for example, a bit error rate (BER). For example, the SIR is calculated from the following Expression (3).

[Math. 3]

$$SIR_{AP\#1} = f_3(MCS_{STA\#1}, BER) \quad (3)$$

Figure 4:
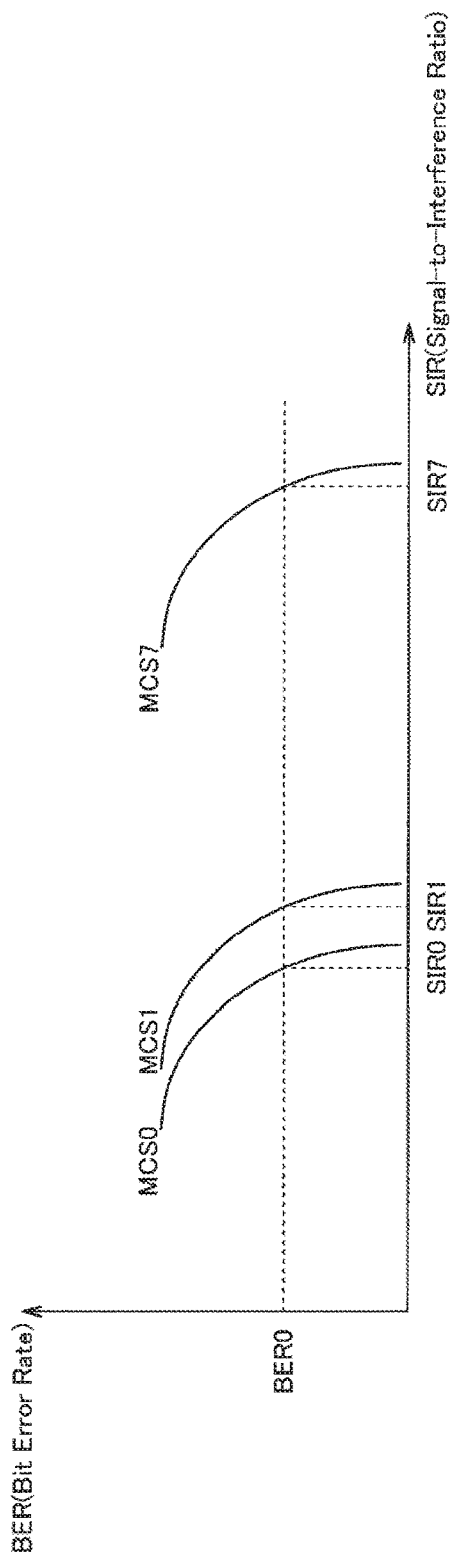
FIG. 4 is a graph illustrating an example of a relation among BER, MCS, and SIR.

In the foregoing Expression (3), f3 indicates a function of calculating an SIR from the MCS and the BER. In addition, MCSSTA#1 is MCS which is the modulation scheme information acquired from the PHY header received from STA 200-1 #1. In addition, the BER indicates a bit error rate to $MCS_{STA\#1}$, which is preferably achieved by AP 100-1 #1. Further, a function $f_3$ will be described with reference to FIG. 4. FIG. 4 is a graph illustrating an example of a relation among the BER, the MCS, and the SIR.

The SIR and the BER have correlation within a certain degree. For example, as illustrated in FIG. 4, the SIR is requested to be higher in order to lower the BER even when the MCS has any value. In addition, a relation between the BER and the SIR differs depending on the value (index) of the MCS. For example, as illustrated in FIG. 4, as the value of the MCS is higher, the higher SIR is requested in order to achieve the same BER. For example, in order to achieve the BER with a value equal to or less than BER0, the SIR with a value equal to or greater than SIR0 is requested in a case in which the value of the MCS is 0 (a case of MCS0). In a case of MCS1, the SIR with a value equal to or greater than SIR1 is requested. In a case of MCS7, the SIR with a value equal to or greater than SIR7 is requested. Moreover, the value of the SIR is higher in the order of SIR0, SIR1, and SIR7.

Moreover, the example in which the index indicating the reception characteristics is the bit error rate has been described above. However, an index, such as a packet error rate (PER), a symbol error rate, or a block error rate, indicating other reception characteristics may be used.

In this way, the distance $d_1$ is calculated. Moreover, the distance $d_1$ may be modified as in the following Expression (4).

[Math. 4]

$$d_1 = f_1(TxP_{STA\#1} - f_2(f_3(MCS_{STA\#1}, BER), I_{AP\#1})) \quad (4)$$

The calculation of the distance $d_1$ has been described above. Next, calculation of distance $d_2$ will be described. The control unit 230 calculates the distance $d_2$ on the basis of an attenuation amount of radio waves related to a signal received by the self-device from STA 200-1 #1. Specifically, the control unit 230 calculates the distance $d_2$ on the basis of the transmission power information acquired from the PHY header and the estimated reception signal strength in regard to the response signal in the self-device. The reception signal strength is specified from reception power information obtained from the communication unit. For example, distance $d_2$ is calculated from the following Expression (5).

[Math. 5]

$$d_2 = f_1(TxP_{STA\#1} - RxP_{STA\#2}) \quad (5)$$

In the foregoing Expression (5), $RxP_{STA\#2}$ indicates reception power of STA 200-1 #2, for example, reception signal strength, in regard to the PHY header received from STA 200-1 #1.

The calculation of the distance $d_2$ has been described above. The distance $d_3$, here, the distance $d_3$min, is calculated using the distances $d_1$ and $d_2$ calculated in this way, as described above.

Subsequently, the control unit 230 calculates an attenuation amount of the radio wave from the calculated distance $d_3$. Specifically, the control unit 230 calculates an attenuation amount of the radio wave related to the signal of the self-device on the basis of the transmission power of the signal of the self-device and the calculated distance $d_3$. For example, the attenuation amount is calculated from the following Expression (6).

[Math. 6]

$$\begin{aligned} A_{STA\#2} &= f_4(d_3) \\ &= f_4(d_1 - d_2) \end{aligned} \quad (6)$$

In the foregoing Expression (6), $f_4$ indicates a function of calculating an attenuation amount from the distances. In addition, $A_{STA\#2}$ indicates the attenuation amount of the radio wave related to the signal transmitted from STA 200-1 #1 and received in STA 200-1 #2. Moreover, the function $f_4$ may be improved on the basis of a previous calculation result.

Subsequently, the control unit 230 decides the allowance transmission power to decide the transmission power on the basis of the calculated attenuation amount and the above-described allowance signal information. Here, reception signal strength $RxP_{STA\#2>AP\#1}$ of AP 100-1 #1 in regard to the signal transmitted from the self-device is calculated from the transmission power of the self-device and the attenuation amount calculated in the foregoing Expression (6). For example, the reception signal strength $RxP_{STA\#2>AP\#1}$ is calculated from the following Expression (7).

[Math. 7]

$$\begin{aligned} RxP_{STA\#2\rightarrow AP\#1} &= TxP_{STA\#2} - A_{STA\#2} \\ &= TxP_{STA\#2} - f_4(d_3) \\ &= TxP_{STA\#2} - f_4(d_1 - d_2) \end{aligned} \quad (7)$$

In the foregoing Expression (7), $TxP_{STA\#2}$ indicates transmission power of STA 200-1 #2.

Since the reception signal strength $RxP_{STA\#2>AP\#1}$ is an interference signal (interference power) in reception of a signal of STA 200-1 #1 by AP 100-1 #1, the reception signal strength $RxP_{STA\#2>AP\#1}$ is preferably less than the allowance interference level $I_{AP\#1}$ of AP 100-1 #1. Accordingly, the reception signal strength $RxP_{STA\#2>AP\#1}$ and the allowance interference level has a relation of the following Expression (8).

[Math. 8]

$$RxP_{STA\#2>AP\#1} = TxP_{STA\#2} - f_4(d_1 - d_2) < I_{AP\#1} \quad (8)$$

On the basis of the relation, allowance transmission power Tolerable_$TxP_{STA\#2}$ to STA 200-1 #2 is decided as in the following Expression (9).

[Math. 9]

$$\text{Tolerable\_}TxP_{STA\#2} < I_{AP\#1} + f_4(d_1 - d_2) \quad (9)$$

Moreover, a value of the right side of the foregoing Expression (9) may be included as an upper limit of a range of the allowance transmission power.

(B-2. Setting of Transmission Power)

STA 200-1 #2 controls transmission power within the range of the decided allowance transmission power in communication with AP 100-1 #2 belonging to BSS #2 of the self-device. Specifically, STA 200-1 #2 receives a trigger signal from AP 100-1 #2 and sets transmission power of the self-device on the basis of the allowance transmission power and the request transmission power information included in the received trigger signal. Then, STA 200-1 #2 transmits a signal which is a response to the trigger signal with the set transmission power. Moreover, the signal may be substantially the same as the response signal or may be a signal different from the response signal.

For example, when the trigger signal is received from AP 100-1 #2, the communication unit acquires the request transmission power information included in the trigger signal. Subsequently, the control unit 230 compares the transmission power indicated by the acquired request transmission power information to the allowance transmission power of the self-device. In a case in which the transmission power indicated by the request transmission power information is equal to or less than the allowance transmission power of the self-device, the control unit 230 sets the transmission power of the self-device to the transmission power indicated by the request transmission power information and causes the communication unit to transmit the signal. In this case, even during stop of the transmission set in the reception of the signal from STA 200-1 #1, the control unit 230 causes the communication unit to transmit the signal. Conversely, in a case in which the transmission power indicated by the request transmission power information is greater than the allowance transmission power of the self-device, the control unit 230 causes the communication unit not to transmit the signal.

Moreover, in a case in which the allowance transmission power is changed in the reception of the PHY header from STA 200-1 #1, the control unit 230 returns the allowance transmission power to the original power when the transmission stop period in regard to the transmission of STA 200-1 #1 ends. For example, the control unit 230 returns the allowance transmission power to transmission power before setting of the transmission stop period or transmission power decided in advance.

(Function of AP #2)

The functional details of AP 100-1 #2 serving as a second destination wireless communication device are substantially the same as functional details of AP 100-1 #1 except that AP 100-1 #2 belongs to another BSS, and therefore the description thereof will be omitted.

2-3. Process of Device

Next, processes of AP 100-1 #1 and STA 200-1 #1 according to the embodiment will be described.

(Overview of Process)

Figure 5:
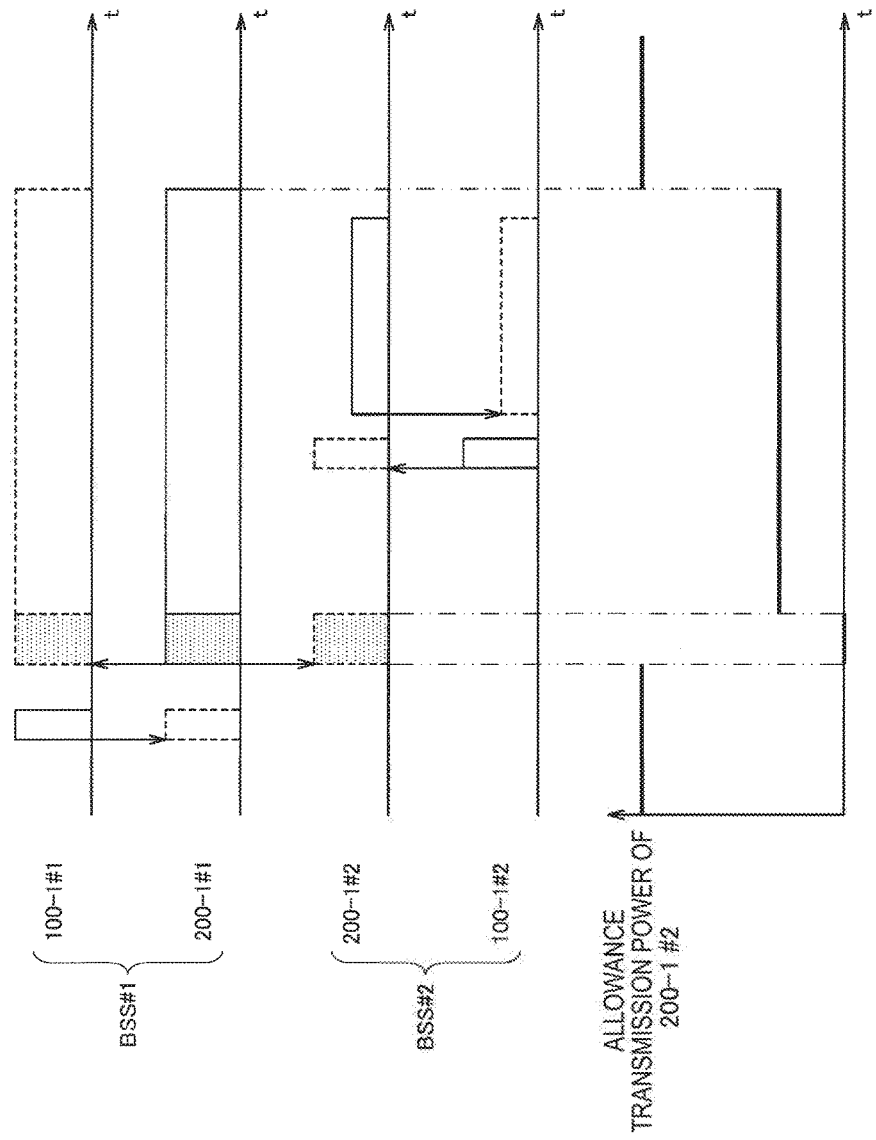
FIG. 5 is a diagram illustrating examples of a signal transmission sequence and a change in allowance transmission power of STA #2 in the signal transmission sequence according to the embodiment.

First, an overview of processes of AP 100-1 #1 and STA 200-1 #1 will be described with reference to FIG. 5. FIG. 5 is a diagram illustrating examples of a signal transmission sequence and a change in the allowance transmission power of STA 200-1 #2 in the signal transmission sequence according to the embodiment.

AP 100-1 #1 first transmits a trigger signal to STA 200-1 #1. For example, AP 100-1 #1 transmits the trigger signal, as illustrated in FIG. 5, in a case in which transmission to STA 200-1 #1 belonging to BSS #1 to which the self-device belongs is permitted.

STA 200-1 #1 receiving the trigger signal transmits a response signal including the PHY header on the basis of the trigger notification information. For example, when the trigger signal is received, STA 200-1 #1 acquires the trigger notification information included in the trigger signal. Subsequently, STA 200-1 #1 generates response header information on the basis of the trigger notification information. Moreover, the response header information may be information which is substantially the same as the trigger notification information. Then, STA 200-1 #1 transmits a response signal including the PHY header that includes the response header information to AP 100-1 #1 using a modulation scheme and transmission power set on the basis of the trigger notification information.

STA 200-1 #2 receiving the response signal decides the allowance transmission power on the basis of the response header information included in the PHY header of the response signal. For example, when the response signal transmitted toward AP 100-1 #1 is received, STA 200-1 #2 acquires the response header information included in the PHY header of the response signal. Subsequently, STA 200-1 #2 decides the allowance transmission power on the basis of the modulation scheme information, the transmission power information, the allowance signal information, and the reception signal strength in regard to the response signal in the acquired response header information. The decided allowance transmission power is lower than a value before reception of the response signal from STA 200-1 #1, as illustrated in FIG. 5.

Subsequently, AP 100-1 #2 transmits the trigger signal to STA 200-1 #2. For example, in a case in which the transmission to STA 200-1 #2 is permitted, AP 100-1 #2 transmits the trigger signal, as illustrated in FIG. 5.

STA 200-1 #2 receiving the trigger signal transmits a signal on the basis of the requested transmission power and the allowance transmission power. For example, when the trigger signal is received, STA 200-1 #2 transmits a signal toward AP 100-1 #2 even during the transmission stop period, as illustrated in FIG. 5, in a case in which the transmission power indicated by the request transmission power information in the trigger notification information included in the trigger signal is equal to or less than the allowance transmission power.

In addition, when the transmission of STA 200-1 #1 ends, the STA 200-1 #2 returns the allowance transmission power to the original power. For example, when the transmission stop period in regard to the transmission of STA 200-1 #1 ends, STA 200-1 #2 returns the allowance transmission power to a value before reception of the signal from STA 200-1 #1, as illustrated in FIG. 5.

(Process of Controlling Allowance Transmission Power)

Figure 6:
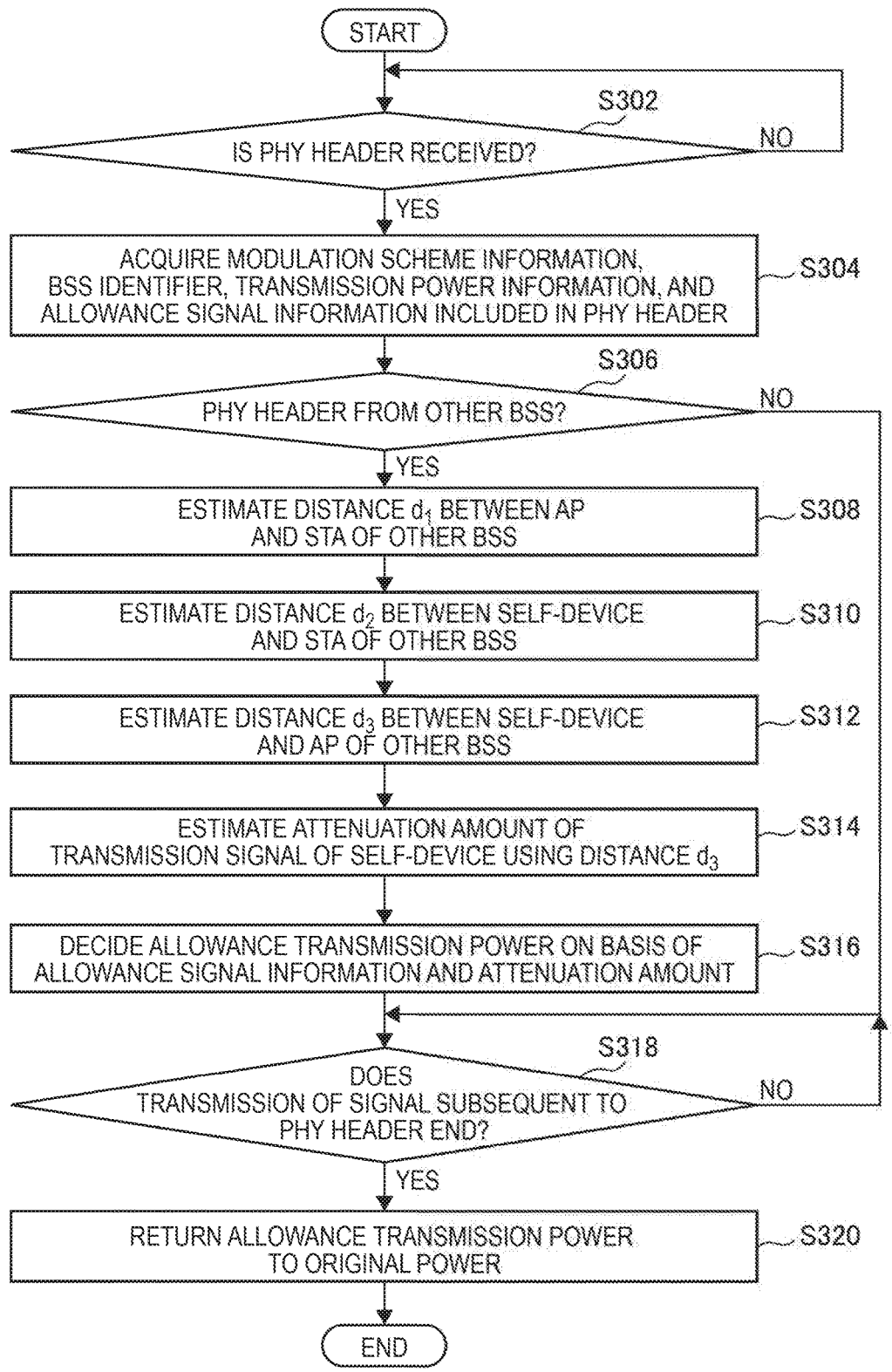
FIG. 6 is a flowchart conceptually illustrating a process of controlling allowance transmission power of STA #2 according to the embodiment.

Next, a process of controlling the allowance transmission power of STA 200-1 #2 will be described with reference to FIG. 6. FIG. 6 is a flowchart conceptually illustrating the process of controlling the allowance transmission power of STA 200-1 #2 according to the embodiment. Moreover, the description of substantially the same process as the above-described process will be omitted.

STA 200-1 #2 waits for reception of the PHY header (step S302). Specifically, the communication unit waits in a state in which the PHY header can be received.

When the PHY header is received, STA 200-1 #2 acquires the modulation scheme information, the BSS identifier, the transmission power information, and the allowance signal information included in the PHY header (step S304). Specifically, when the PHY header is received, the communication unit acquires the MCS information, the BSS identifier, the transmission power information, and the allowance signal information included in the PHY header.

Subsequently, STA 200-1 #2 determines whether the received PHY header is the PHY header from the other BSS (step S306). Specifically, the control unit 230 determines whether the acquired BSS identifier matches the BSS #2 to which the self-device belongs.

When it is determined that the received PHY header is the PHY header from the other BSS, STA 200-1 #2 estimates the distance $d_1$ between AP 100-1 #1 and STA 200-1 #1 of the other BSS (step S308). Specifically, when it is determined that the acquired BSS identifier matches BSS #2 to which the self-device belongs, the control unit 230 estimates the above-described distance $d_1$ on the basis of the acquired MCS information, transmission power information, and allowance signal information.

Subsequently, STA 200-1 #2 estimates the distance d2 between the self-device and STA 200-1 #1 of the other BSS (step S310). Specifically, the control unit 230 estimates the above-described distance $d_2$ on the basis of the acquired transmission power information and the reception signal strength in regard to the PHY header.

Subsequently, STA 200-1 #2 estimates the distance d3 between the self-device and AP 100-1 #1 of the other BSS (step S312). Specifically, the control unit 230 estimates the distance $d_3$ from the estimated distances $d_1$ and $d_2$.

Subsequently, STA 200-1 #2 estimates the attenuation amount of the transmission signal of the self-device using the distance $d_3$ (step S314). Specifically, the control unit 230 estimates the attenuation amount of the radio wave related to the signal transmitted by the self-device and received in AP 100-1 #1 using the estimated distance $d_3$.

Subsequently, STA 200-1 #2 decides the allowance transmission power on the basis of the allowance signal information and the attenuation amount (step S316). Specifically, the control unit 230 decides the allowance transmission power on the basis of the estimated attenuation amount and the allowance signal information.

Subsequently, STA 200-1 #2 determines whether the transmission of the signal subsequent to the PHY header ends (step S318). Specifically, the control unit 230 determines whether the transmission stop period in regard to the transmission from STA 200-1 #1 ends.

When it is determined that the transmission of the signal subsequent to the PHY header ends, STA 200-1 #2 returns the allowance transmission power to the original power (step S320). Specifically, when it is determined that the transmission stop period ends, the control unit 230 returns the allowance transmission power to the original value.

(Signal Transmission Process)

Figure 7:
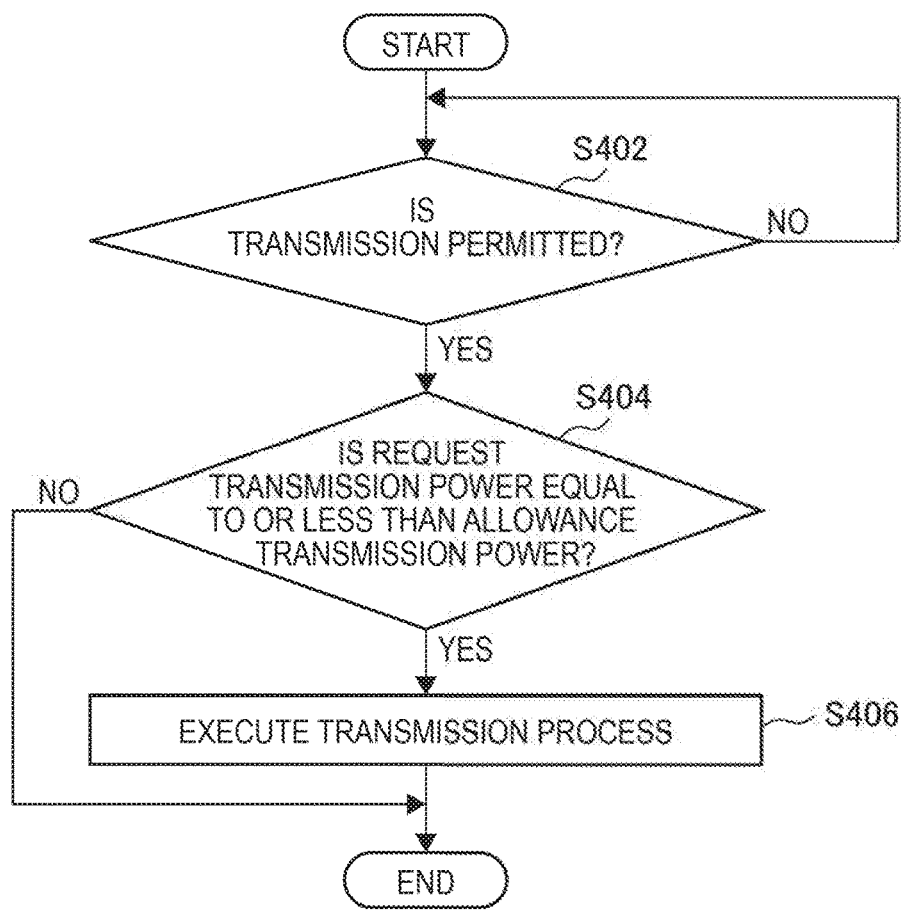
FIG. 7 is a flowchart conceptually illustrating a signal transmission process of STA #2 according to the embodiment.

Next, a signal transmission process of STA 200-1 #2 will be described with reference to FIG. 7. FIG. 7 is a flowchart conceptually illustrating the signal transmission process of STA 200-1 #2 according to the embodiment. Moreover, the description of substantially the same process as the above-described process will be omitted.

STA 200-1 #2 determines whether transmission is permitted (step S402). Specifically, the communication unit determines whether the trigger signal is received from AP 100-1 #2.

When it is determined that the transmission is permitted, STA 200-1 #2 determines whether the request transmission power is equal to or less than the allowance transmission power (step S404). Specifically, when it is determined that the trigger signal is received, the control unit 230 determines whether the transmission power indicated by the request transmission power information included in the trigger signal is equal to or less than the allowance transmission power.

When it is determined that the request transmission power is equal to or less than the allowance transmission power, STA 200-1 #2 executes the transmission process (step S406). Specifically, when it is determined that the transmission power indicated by the request transmission power information is equal to or less than the allowance transmission power, the control unit 230 causes the communication unit to transmit a signal.

2-4. Conclusion of First Embodiment

In this way, according to the first embodiment of the present disclosure, STA 200-1 #2 receives the PHY header including the modulation scheme information from STA 200-1 #1 belonging to the first wireless communication network different from the second wireless communication network to which the self-device belongs, and controls transmission power on the basis of information obtained in the reception of the PHY header. In addition, STA 200-1 #1 transmits the PHY header including the modulation scheme information. In addition, AP 100-1 #1 transmits the signal including the modulation scheme information. Therefore, in a case in which the signal is received from the wireless communication device of the other BSS, the signal can be transmitted to the degree of transmission power which does not disturb communication in the other BSS. Accordingly, by executing the transmission even during the transmission stop period such as an NAV period of the related art, it is possible to improve use efficiency of communication resources during the transmission stop period.

In addition, the PHY header includes an identifier of the wireless communication network. Therefore, it is possible to determine whether the received PHY header is the PHY header transmitted from the device belonging to the other BSS. Accordingly, transmission in the case of the reception of the PHY header from the device belonging to the BSS to which the self-device belongs is prevented, and thus it is possible to suppress disturbance of the communication in the BSS to which the self-device belongs.

In addition, the PHY header includes the transmission power information in which the transmission power of STA 200-1 #1 is specified. Here, since the transmission power may be fixed or variable, there is a possibility of the transmission power being varied. In a case in which the transmission power is fixed, the transmission power information may be stored in advance in STA 200-1 #2. However, when the transmission power is variable, it is difficult to ascertain the transmission power. As result, accuracy of the estimation of the distances or the like between the above-described devices executed using the transmission power is not ensured. In the configuration, however, the distances or the like between the above-described devices can be estimated more accurately on the basis of the transmission power of STA 200-1 #1 which is a transmission source of the PHY header.

In addition, the PHY header includes the allowance signal information in which allowance of another signal for signal reception in AP 100-1 #1 which is a destination of a frame subsequent to the PHY header is specified. Here, since the allowance signal information is changed depending on a communication situation, it is difficult to ascertain the allowance signal information. In this configuration, however, since the allowance signal information is notified of via STA 200-1 #1, the distances or the like between the above-described devices can be estimated more accurately. Moreover, a value stored in advance may be used as the allowance signal information.

In addition, the allowance of the other signal for the signal reception includes the degree of interference by the other signal to be allowed or the degree of reception power of the other signal to be allowed. Therefore, an existing index such as an allowance interference level or a reception power allowable degree is used, and thus it is easy to realize the process of deciding the transmission power.

In addition, STA 200-1 #2 decides the transmission power on the basis of the attenuation amount of the radio wave related to the signal to be transmitted by the self-device. The attenuation amount is estimated on the basis of information obtained in the reception of the PHY header. Therefore, the transmission power is decided in consideration of the attenuation of the radio wave, and thus deficiency or excess of the transmission power can be suppressed. Accordingly, it is possible to maintain or improve a reception success ratio of the signal to be transmitted by the self-device while suppressing the possibility of the disturbance in the communication of the other BSS.

In addition, STA 200-1 #2 decides the transmission power on the basis of the allowance signal information and the attenuation amount. Therefore, it is possible to select higher transmission power within a range in which signal reception of AP 100-1 #1 is not disturbed.

In addition, the attenuation amount is estimated on the basis of the distance between the self-device and AP 100-1 #1, and the distance is estimated on the basis of the information obtained in the reception of the PHY header. Therefore, even in a case in which it is difficult to directly estimate the attenuation amount, the attenuation amount can be estimated using the distance.

In addition, the distance includes a difference between the distance between STA 200-1 #1 and AP 100-1 #1 and a distance between the self-device and STA 200-1 #1. Therefore, it is possible to lower a possibility of an influence of the transmission of STA 200-1 #1 on the communication in the other BSS.

In addition, the information obtained in the reception of the PHY header and used to control the transmission power includes at least one of the modulation scheme information, transmission power information, and the allowance signal information included in the PHY header and reception signal strength in regard to the PHY header. Therefore, in a case in which all the pieces of information are included, it is possible to improve accuracy of the process of controlling the transmission power. Conversely, even in a case in which some of the pieces of information are deficient, for example, a value stored in advance can be used for the deficient information to execute the process of controlling the transmission power.

In addition, in a case in which the transmission power requested from AP 100-1 #2 which is a destination of a signal to be transmitted by the self-device is equal to or less than the decided transmission power, STA 200-1 #2 transmits the signal with the requested transmission power. Therefore, by transmitting the signal with only transmission power which rarely affects the communication of the other BSS while satisfying a request from AP 100-1 #2, it is possible to suppress disturbance of the communication of the other BSS while maintaining the reception success ratio.

In addition, the transmission of the signal with the requested transmission power includes transmission of a signal during the transmission stop time set in reception of a signal from t STA 200-1 #1. Therefore, by permitting transmission of the signal during a period in which the transmission is suppressed in the related art, it is possible to increase a communication opportunity. Accordingly, it is possible to improve use efficiency of communication resources.

3. SECOND EMBODIMENT OF THE PRESENT DISCLOSURE (CASE IN WHICH SIGNAL IS NOT RECEIVED FROM AP OF ANOTHER BSS)

AP 100-1 and STA 200-1 according to the first embodiment of the present disclosure have been described above. Next, an AP 100-2 and an STA 200-2 according to a second embodiment of the present disclosure will be described. In the embodiment, a case in which a signal transmitted from AP 100-2 #1 belonging to another BSS is not received in STA 200-2 #2 is assumed. Moreover, the configurations of the devices are substantially the same as the configurations according to the first embodiment, and therefore the description thereof will be omitted. In addition, a flow of processes of the devices is substantially the same as that of the processes according to the first embodiment, and therefore the description thereof will be omitted.

3-1. Details of Function of Device

Functions of AP 100-2 #1, AP 100-2 #2, and STA 200-2 #1 according to the embodiment are substantially the same as the functions according to the first embodiment, and therefore only a function of STA 200-2 #2 will be described. (Function of STA #2)

Figure 8:
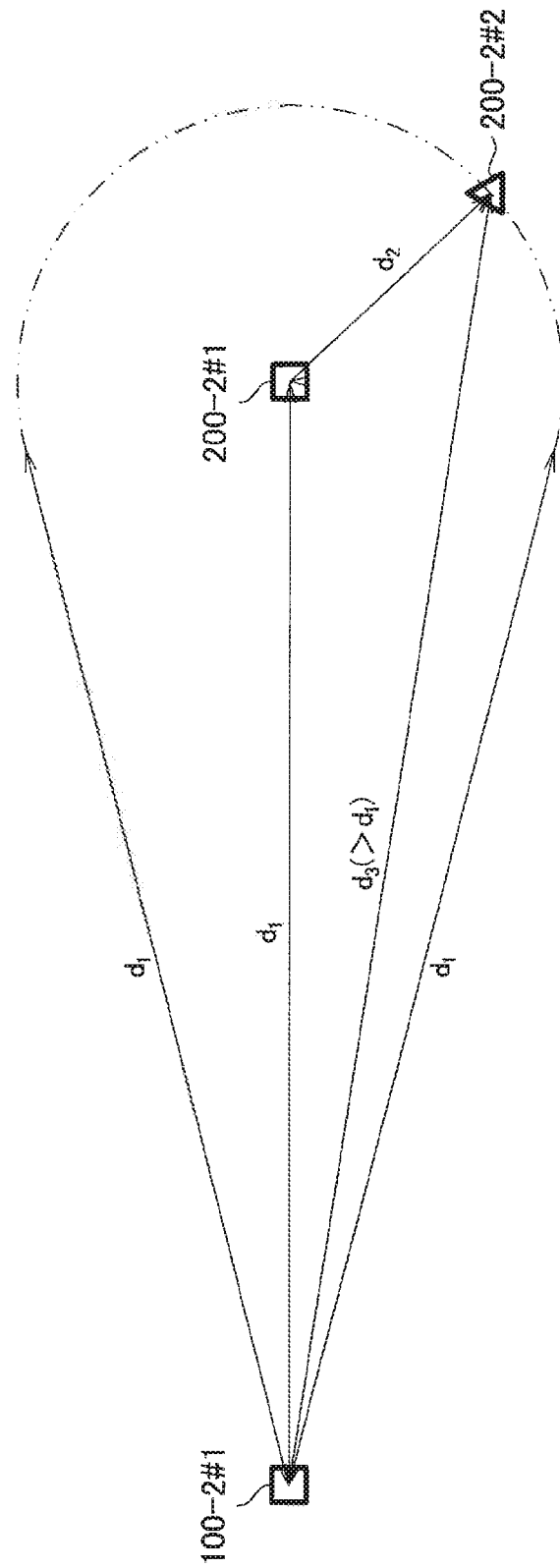
FIG. 8 is an explanatory diagram illustrating a process of controlling transmission power according to a second embodiment of the present disclosure.

In a case in which a signal is not received from AP 100-2 #1, STA 200-2 #2 executes transmission power control on the assumption that the distance $d_3$ between AP 100-2 #1 and the self-device is equal to or greater than the distance $d_1$ between AP 100-2 #1 and STA 200-2 #1. A process of controlling transmission power according to the embodiment will be described with reference to FIG. 8. FIG. 8 is an explanatory diagram illustrating the process of controlling transmission power according to the embodiment.

In the embodiment, a situation in which STA 200-2 #2 does not receive a signal from AP 100-2 #1 and receives a signal from STA 200-2 #1 is assumed. In this situation, STA 200-2 #2 is considered to be located farther from AP 100-2 #1 than at least the distance $d_1$ between AP 100-2 #1 and STA 200-2 #1. For example, there is a possibility of STA 200-2 #2 being located as in FIG. 8. Therefore, the distance $d_3$ between STA 200-2 #2 and AP 100-2 #1 is considered to be longer than the distance $d_1$. Accordingly, it is considered that the allowance transmission power may be less than the transmission power allowed in a case in which the distance $d_3$ is the distance $d_1$.

Accordingly, the control unit 230 calculates allowance transmission power from the following Expression (10) based on Expressions (7) and (9) described above.
[Math. 10]

$$\text{Tolerable\_}TxP_{STA\#2} < I_{AP\#1} + f_4(d_1) \qquad (10)$$

Moreover, a value of the right side of the foregoing Expression (10) may be included as an upper limit of a range of the allowance transmission power.

3-2. Conclusion of Second Embodiment

In this way, according to the second embodiment, the distance between STA 200-2 #2 and AP 100-2 #1 includes the distance between STA 200-2 #1 and AP 100-2 #1 in a case in which a signal is not received from AP 100-2 #1. Therefore, it is easier to decide higher allowance transmission power than in a case in which the allowance transmission power is decided irrespective of whether a signal is received from AP 100-2 #1 as in the first embodiment. Accordingly, a possibility of the transmission power requested from AP 100-2 #2 being satisfied, and thus transmission opportunities of STA 200-2 #2 increase. As a result, it is possible to improve use efficiency of communication resources.

4. THIRD EMBODIMENT OF THE PRESENT DISCLOSURE (CASE IN WHICH SIGNAL IS RECEIVED FROM AP OF ANOTHER BSS)

AP 100-2 and STA 200-2 according to the second embodiment of the present disclosure have been described above. Next, an AP 100-3 and an STA 200-3 according to a third embodiment of the present disclosure will be described. In the embodiment, a case in which a signal transmitted from AP 100-3 #1 belonging to another BSS is received in STA 200-3 #2 is assumed. Moreover, the description of the configurations and processes of the devices will be omitted as in the second embodiment.

4-1. Details of Function of Device

Functions of AP 100-3 #1, AP 100-3 #2, and STA 200-3 #1 according to the embodiment are substantially the same as the functions according to the first embodiment, and therefore only a function of STA 200-3 #2 will be described. (Function of STA #2)

Figure 9:
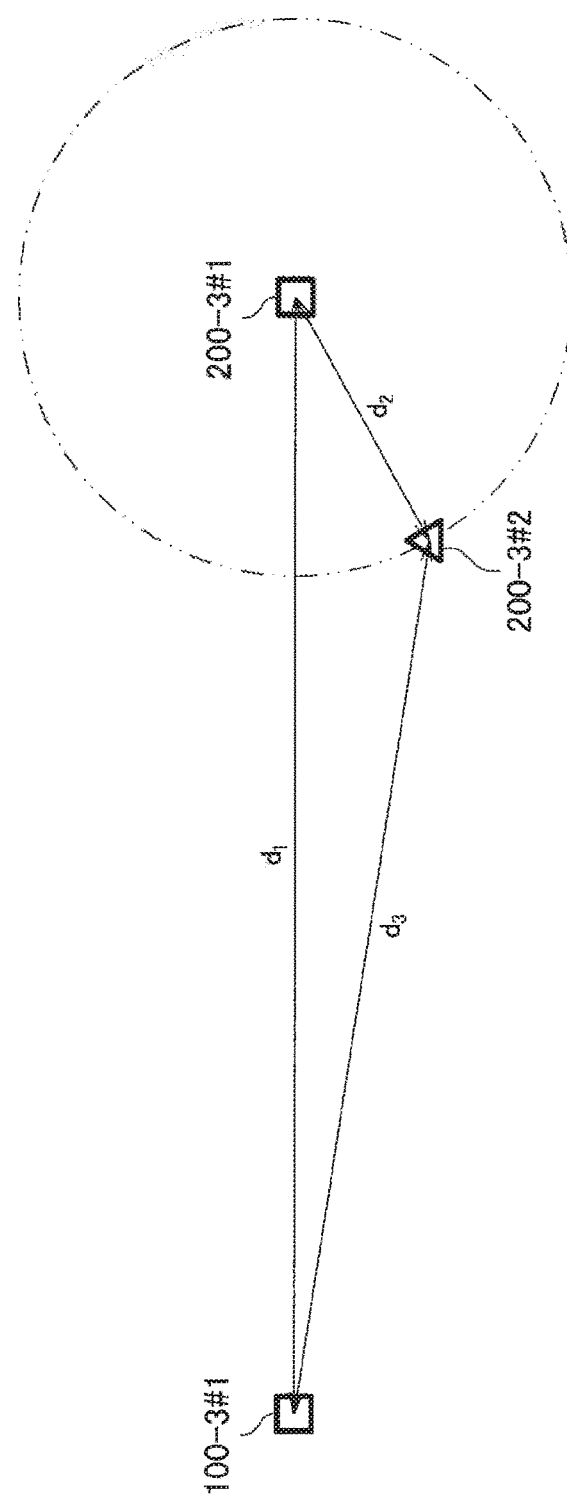
FIG. 9 is an explanatory diagram illustrating a process of controlling transmission power according to a third embodiment of the present disclosure.

In a case in which a signal is received from AP 100-3#1, STA 200-3 #2 executes transmission power control on the basis of the distance $d_3$ between AP 100-3 #1 and the self-device estimated on the basis of the reception of the signal. Specifically, in a case in which a signal is received from AP 100-3 #1, the control unit 230 estimates the distance d3 on the basis of the reception of the signal from AP 100-3 #1. A process of controlling the transmission power according to the embodiment will be described in detail with reference to FIG. 9. FIG. 9 is an explanatory diagram illustrating the process of controlling transmission power according to the embodiment.

In the embodiment, a situation in which STA 200-3 #2 receives a signal from AP 100-3 #1 is assumed. For example, there is a possibility of STA 200-3 #2 being located as in FIG. 9. In the situation, STA 200-3 #2 can directly estimate the distance between AP 100-3 #1 and the self-device.

Accordingly, the control unit 230 estimates the distance $d_3$ on the basis of reception power information regarding the signal received from AP 100-3 #1 and the transmission power information regarding AP 100-3 #1. Then, the control unit 230 decides the allowance transmission power using the estimated distance $d_3$.

Specifically, the control unit 230 first acquires the reception power information regarding the signal received from AP 100-3 #1, that is, the reception signal strength. For example, the reception signal strength can be obtained through measurement of the communication unit.

Subsequently, the control unit 230 acquires the transmission power information regarding AP 100-3 #1. For example, the transmission power information is included in a signal to be transmitted by AP 100-3 #1. Moreover, the transmission power of AP 100-3 #1 may be a value stored in advance in STA 200-3 #2.

Subsequently, the control unit 230 calculates the distance d3 using the above-described function $f_1$. For example, the distance $d_3$ is calculated from the following Expression (11).
[Math. 11]

$$d_3 = f_1(TxP_{AP\#1} - RxP_{AP\#1 > STA\#2}) \quad (11)$$

In the foregoing Expression (11), $TxP_{AP\#1}$ indicates transmission power of AP 100-3 #1 and $RxP_{AP\#1 > STA\#2}$ indicates reception power of STA 200-3 #2 in regard to a signal received from AP 100-3 #1, for example, reception signal strength.

Then, the control unit 230 calculates the allowance transmission power from the following Expression (12) based on Expressions (7) and (9) described above.
[Math. 12]

$$\text{Tolerable}\_TxP_{STA\#2} < I_{AP\#1} + f_4(d_3) \quad (12)$$

Moreover, a value of the right side of the foregoing Expression (12) may be included as an upper limit of a range of the allowance transmission power.

4-2. Conclusion of Third Embodiment

In this way, according to the third embodiment, the distance between STA 200-3 #2 and AP 100-3 #1 includes the distance between STA 200-3 #2 and AP 100-3 #1 estimated on the basis of the reception of a signal from AP 100-3 #1 in a case in which the signal is received from AP 100-3 #1. Therefore, it is possible to improve accuracy of the estimated distance $d_3$ between STA 200-3 #2 and AP 100-3 #1. Accordingly, it is easy to decide the allowance transmission power to an appropriate value, and it is possible to more reliably realize the increase in the transmission opportunities of STA 200-3 #2 without disturbing communication of the other BSS.

5. APPLICATION EXAMPLES

The technology according to the present disclosure is applicable to various products. For example, the STA 200 may be implemented as a mobile terminal such as smartphones, tablet personal computers (PCs), notebook PCs, portable game terminals, or digital cameras, a fixed-type terminal such as television receivers, printers, digital scanners, or network storages, or a car-mounted terminal such as car navigation devices. In addition, the communication device 100 may be implemented as a terminal (also referred to as machine type communication (MTC) terminal) which performs machine-to-machine (M2M) communication, such as smart meters, vending machines, remote monitoring devices, or point of sale (POS) terminals. Furthermore, the STA 200 may be a wireless communication module mounted in such terminals (e.g., integrated circuit modules including one die).

On the other hand, for example, the AP 100 may be implemented as a wireless LAN access point (also referred to as a wireless base station) having or not having a router function. In addition, the AP 100 may be implemented as a mobile wireless LAN router. Furthermore, the AP 100 may be a wireless communication module (e.g., integrated circuit modules including one die) mounted on these devices.

5-1. First Application Example

Figure 10:
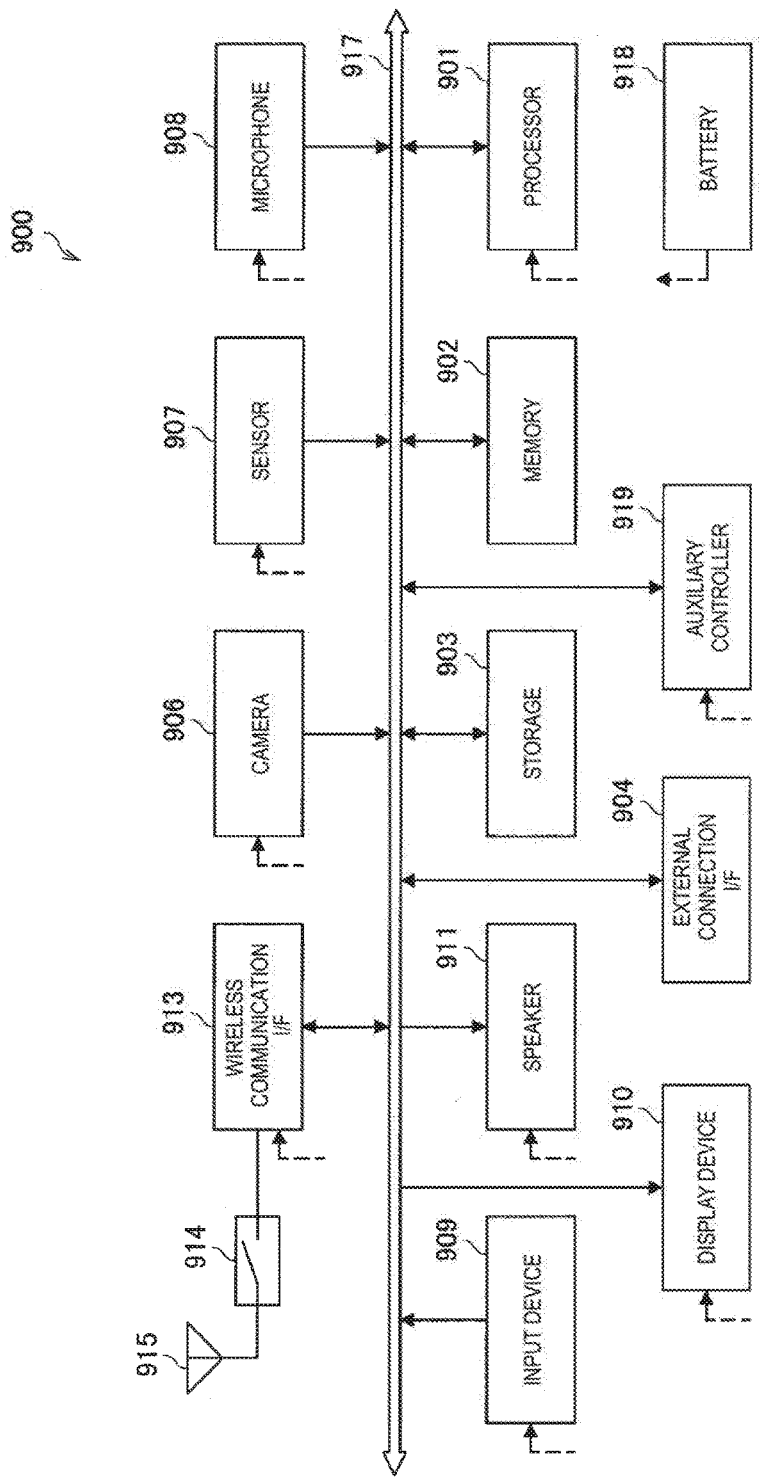
FIG. 10 is a block diagram illustrating an example of a schematic configuration of a smartphone.

FIG. 10 is a block diagram illustrating an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores programs executed by the processor 901 and data. The storage 903 can include a storage medium such as a semiconductor memory or a hard disk. The external connection interface 904 is an interface for connecting an externally attached device such as a memory card or a universal serial bus (USB) device to the smartphone 900.

The camera 906 includes, for example, an image sensor such as a charge coupled device (CCD) or a complementary metal oxide semiconductor (CMOS), and generates a captured image. The sensor 907 can include a sensor group including, for example, a positioning sensor, a gyro sensor, a geomagnetic sensor, an acceleration sensor, and the like. The microphone 908 converts voice input to the smartphone 900 into an audio signal. The input device 909 includes, for example, a touch sensor that detects touches on a screen of the display device 910, a key pad, a keyboard, buttons, switches, and the like, and accepts an operation or information input from a user. The display device 910 includes a screen such as a liquid crystal display (LCD) or an organic light emitting diode (OLED) display, and displays an output image of the smartphone 900. The speaker 911 converts an audio signal output from the smartphone 900 into voice.

The wireless communication interface 913 supports one or more of wireless LAN standards such as IEEE 802.11a, 11b, 11g, 11n, 11ac, and 11ad, and executes wireless LAN communication. The wireless communication interface 913 can communicate with other devices via a wireless LAN access point in an infrastructure mode. In addition, the wireless communication interface 913 can directly communicate with other devices in a direct communication mode such as an ad hoc mode, or Wi-Fi Direct (registered trademark). Note that, in Wi-Fi Direct mode, unlike the ad hoc mode, one of two terminals operates as an access point, but communication is performed directly between the terminals. The wireless communication interface 913 can typically include a baseband processor, a radio frequency (RF) circuit, a power amplifier, and the like. The wireless communication interface 913 may be a single-chip module on which a memory for storing a communication control program, a processor for executing the program, and a relevant circuit are integrated. The wireless communication interface 913 may support other types of wireless communication schemes such as a short-range wireless communication scheme, a close proximity wireless communication scheme, or a cellular communication scheme, in addition to the wireless LAN scheme. The antenna switch 914 switches a connection destination of the antenna 915 among a plurality of circuits (e.g., circuits for different wireless communication schemes) included in the wireless communication interface 913. The antenna 915 includes a single antenna element or a plurality of antenna elements (e.g., a plurality of antenna elements included in a MIMO antenna), and is used for transmission and reception of a wireless signal through the wireless communication interface 913.

Note that the configuration of the smartphone 900 is not limited to the example of FIG. 10, and the smartphone 900 may include a plurality of antennas (e.g., an antenna for a wireless LAN and an antenna for a close proximity wireless communication scheme). In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 illustrated in FIG. 10 via a power supply line partially indicated by dashed lines in the figure. The auxiliary controller 919 causes the required minimum functions of the smartphone 900 to operate, for example, in the sleep mode.

In the smartphone 900 illustrated in FIG. 10, the data processing unit 210, the wireless communication unit 220, and the control unit 230 described with reference to FIG. 2 may be mounted on the wireless communication interface 913. In addition, at least some of these functions may be mounted on the processor 901 or the auxiliary controller 919. For example, when the PHY header is received, the wireless communication unit 220 acquires information such as the modulation scheme information included in the PHY header. Subsequently, the control unit 230 decides the allowance transmission power on the basis of the acquired information and sets the transmission power within the range of the allowance transmission power. Then, the wireless communication unit 220 transmits a signal with the set transmission power. Thus, even during communication of the wireless communication device belonging to the other BSS, the smartphone 900 can execute communication. Accordingly, it is possible to improve use efficiency of communication resources.

Note that the smartphone 900 may operate as a wireless access point (software AP) by the processor 901 executing an access point function at the application level. In addition, the wireless communication interface 913 may have the wireless access point function.

3-2. Second Application Example

Figure 11:
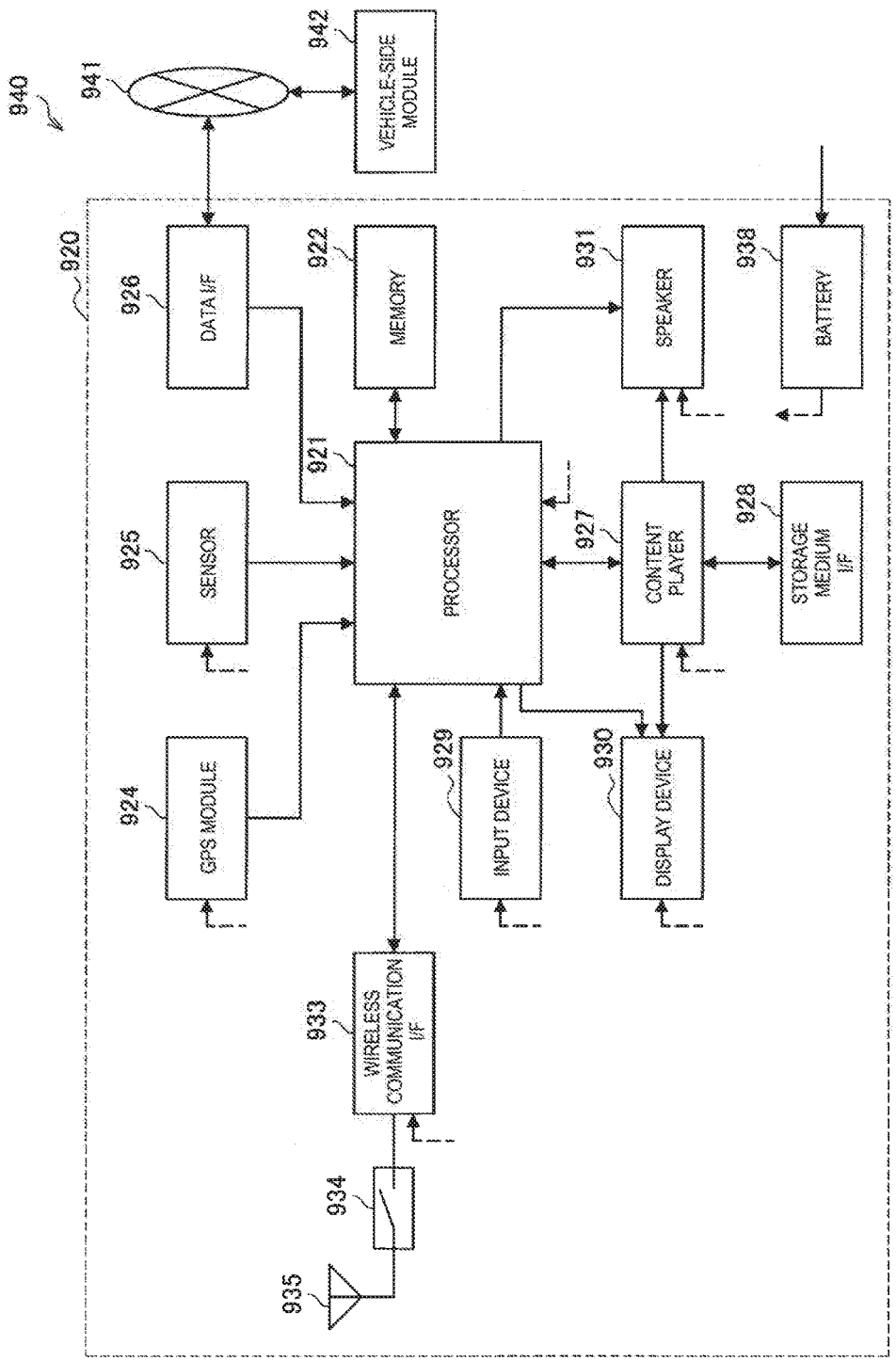
FIG. 11 is a block diagram illustrating an example of a schematic configuration of a car navigation device.

FIG. 11 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or SoC, and controls a navigation function and other functions of the car navigation device 920. The memory 922 includes a RAM and a ROM, and stores programs executed by the processor 921 and data.

The GPS module 924 measures the position (e.g., latitude, longitude, and altitude) of the car navigation device 920 using GPS signals received from a GPS satellite. The sensor 925 can include a sensor group including, for example, a gyro sensor, a geomagnetic sensor, and a barometric sensor. The data interface 926 is connected to, for example, an in-vehicle network 941 via a terminal that is not illustrated, and acquires data generated on the vehicle side such as car speed data.

The content player 927 reproduces the content stored in a storage medium (e.g., CD or DVD) inserted into the storage medium interface 928. The input device 929 includes, for example, a touch sensor that detects touches on a screen of the display device 930, buttons, switches, and the like, and accepts an operation or information input from the user. The display device 930 includes a screen such as an LCD or an OLED display, and displays a navigation function or an image of content to be reproduced. The speaker 931 outputs sound of the navigation function or the content to be reproduced.

The wireless communication interface 933 supports one or more of wireless LAN standards such as IEEE 802.11a, 11b, 11g, 11n, 11ac, and 11ad, and executes wireless LAN communication. The wireless communication interface 933 can communicate with other devices via a wireless LAN access point in an infrastructure mode. In addition, the wireless communication interface 933 can directly communicate with other devices in a direct communication mode, such as an ad hoc mode and Wi-Fi Direct. The wireless communication interface 933 can typically include a baseband processor, an RF circuit, a power amplifier, and the like. The wireless communication interface 933 may be a single-chip module on which a memory for storing a communication control program, a processor for executing the program, and a relevant circuit are integrated. The wireless communication interface 933 may support other types of wireless communication schemes such as a short-range wireless communication scheme, a close proximity wireless communication scheme, or a cellular communication scheme, in addition to the wireless LAN scheme. The antenna switch 934 switches a connection destination of the antenna 935 among a plurality of circuits included in the wireless communication interface 933. The antenna 935 includes a single antenna element or a plurality of antenna elements, and is used for transmission and reception of a wireless signal through the wireless communication interface 933.

Note that the configuration of the car navigation device 920 is not limited to the example of FIG. 11, and the car navigation device 920 may include a plurality of antennas. In this case, the antenna switch 934 may be omitted from the configuration of the car navigation device 920.

The battery 938 supplies electric power to each of the blocks of the car navigation device 920 illustrated in FIG. 11 via a power supply line partially indicated by a dashed line in the figure. In addition, the battery 938 accumulates electric power supplied from the vehicle side.

In the car navigation device 920 illustrated in FIG. 11, the data processing unit 210, the wireless communication unit 220, and the control unit 230 described with reference to FIG. 2 may be mounted on the wireless communication interface 933. In addition, at least some of these functions may be mounted on the processor 921. For example, when the PHY header is received, the wireless communication unit 220 acquires information such as the modulation scheme information included in the PHY header. Subsequently, the control unit 230 decides the allowance transmission power on the basis of the acquired information and sets the transmission power within the range of the allowance transmission power. Then, the wireless communication unit 220 transmits a signal with the set transmission power. Thus, even during communication of the wireless communication device belonging to the other BSS, the car navigation device 920 can execute communication. Accordingly, it is possible to improve use efficiency of communication resources.

In addition, the wireless communication interface 933 may operate as the above-described AP 100 and may provide wireless connection to a terminal carried by a user getting in a vehicle. At this time, for example, in a case in which the terminal has substantially the same configuration as the STA 200 according to any of the embodiments of the present disclosure described above, the car navigation device 920 can communicate with the terminal by transmitting a trigger signal to the terminal even while a terminal belonging to the other BSS is executing communication.

Further, the technology according to the present disclosure may be implemented as an in-vehicle system (or vehicle) 940 including one or more blocks of the above-described car navigation device 920, the in-vehicle network 941, and a vehicle-side module 942. The vehicle-side module 942 generates vehicle-side data such as vehicle speed, engine rpm, or failure information, and outputs the generated data to the in-vehicle network 941.

5-3. Third Application Example

Figure 12:
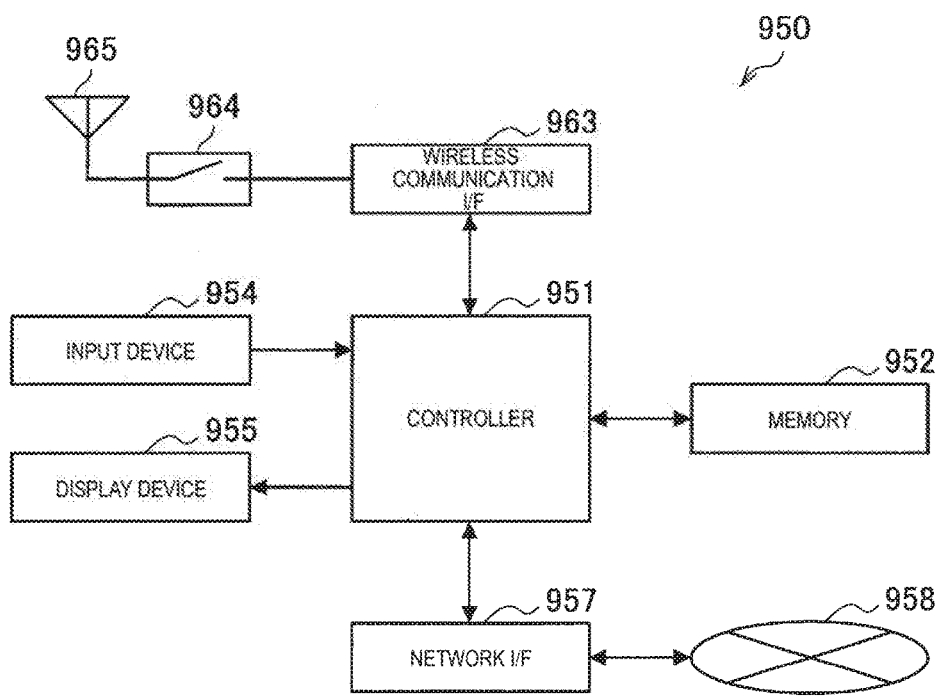
FIG. 12 is a block diagram illustrating an example of a schematic configuration of a wireless access point.

FIG. 12 is a block diagram illustrating an example of a schematic configuration of a wireless access point 950 to which the technology according to the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP), and causes various functions (e.g., access restriction, routing, encryption, firewall, log management, and the like) of the Internet Protocol (IP) layer and higher layers of the wireless access point 950 to be operated. The memory 952 includes a RAM and a ROM, and stores a program to be executed by the controller 951 and various kinds of control data (e.g., a terminal list, a routing table, an encryption key, security settings, a log, and the like).

The input device 954 includes, for example, a button, a switch, or the like and accepts an operation from a user. The display device 955 includes an LED lamp or the like, and displays operation status of the wireless access point 950.

The network interface 957 is a wired communication interface for the wireless access point 950 to connect to a wired communication network 958. The network interface 957 may include a plurality of connection terminals. The wired communication network 958 may be a LAN such as Ethernet (registered trademark) or a wide area network (WAN).

The wireless communication interface 963 supports one or more of wireless LAN standards such as IEEE 802.11a, 11b, 11g, 11n, 11ac, and 11ad, and provides wireless connection to a neighboring terminal as an access point. The wireless communication interface 963 can typically include a baseband processor, an RF circuit, a power amplifier, and the like. The wireless communication interface 963 may be a single-chip module on which a memory for storing a communication control program, a processor for executing the program, and a relevant circuit are integrated. The antenna switch 964 switches a connection destination of the antenna 965 among a plurality of circuits included in the wireless communication interface 963. The antenna 965 includes a single antenna element or a plurality of antenna elements, and is used for transmission and reception of a wireless signal through the wireless communication interface 963.

In the wireless access point 950 illustrated in FIG. 12, the data processing unit 110, the wireless communication unit 120, and the control unit 130 described with reference to FIG. 2 may be mounted on the wireless communication interface 963. In addition, at least some of these functions may be mounted on the controller 951. For example, in a case in which a terminal connected to the wireless access point 950 has substantially the same configuration as the STA 200 according to any of the embodiments of the present disclosure described above, the wireless access point 950 can communicate with the terminal by transmitting a trigger signal to the terminal even while a terminal belonging to the other BSS is executing communication.

6. CONCLUSION

As described above, according to the first embodiment of the present disclosure, in a case in which a signal is received from a wireless communication device of another BSS, the signal can be transmitted to the degree of transmission power which does not disturb communication in the other BSS. Accordingly, by executing the transmission even during the transmission stop period such as an NAV period of the related art, it is possible to improve use efficiency of communication resources during the transmission stop period.

In addition, according to the second embodiment of the present disclosure, it is easier to decide higher allowance transmission power than in a case in which the allowance transmission power is decided irrespective of whether a signal is received from AP 100-2 #1 as in the first embodiment. Accordingly, a possibility of the transmission power requested from AP 100-2 #2 being satisfied, and thus transmission opportunities of STA 200-2 #2 increase. As a result, it is possible to improve use efficiency of communication resources.

In addition, according to the third embodiment of the present disclosure, it is possible to improve accuracy of the estimated distance $d_3$ between STA 200-3 #2 and AP 100-3 #1. Accordingly, it is easy to decide the allowance transmission power to an appropriate value, and it is possible to more reliably realize the increase in the transmission opportunities of STA 200-3 #2 without disturbing communication of the other BSS.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the foregoing embodiments, the transmission power control of STA 200 #2 has been executed on the basis of the PHY header received from STA 200 #1, but the present disclosure is not limited to the example. For example, in a case in which a signal including a similar PHY header is received from AP 100 #1, STA 200 #2 may execute the transmission power control on the basis of the PHY header received from AP 100 #1.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, not only a process in which steps shown in the flowcharts of the above embodiments are performed in a time-series manner in accordance with a described sequence but also a process in which the steps are not necessarily processed in a time-series manner but are executed in parallel or individually is included. Also, it is self-evident that even steps processed in a time-series manner can be appropriately changed in sequence depending on circumstances.

Additionally, the present technology may also be configured as below.

(1)

A wireless communication device including:

a communication unit configured to receive a physical layer (PHY) header including modulation scheme information from a first wireless communication device belonging to a first wireless communication network different from a second wireless communication network to which a self-device belongs; and a control unit configured to control transmission power on a basis of information obtained in reception of the PHY header.

(2)

The wireless communication device according to (1), in which the PHY header includes an identifier of a wireless communication network.

(3)

The wireless communication device according to (1) or (2), in which the PHY header includes transmission power information in which transmission power of the first wireless communication device is specified.

(4)

The wireless communication device according to any one of (1) to (3), in which the PHY header includes allowance signal information in which allowance of another signal for signal reception in a first destination wireless communication device which is a destination of a frame subsequent to the PHY header is specified.

(5)

The wireless communication device according to (4), in which the allowance of the other signal for the signal reception includes a degree of interference by the other signal to be allowed or a degree of reception power of the other signal to be allowed.

(6)

The wireless communication device according to (4) or (5), in which the control unit decides transmission power on a basis of an attenuation amount of radio waves related to a signal that the self-device is to transmit, and the attenuation amount is estimated on the basis of the information obtained in the reception of the PHY header.

(7)

The wireless communication device according to (6), in which the control unit decides the transmission power on a basis of the allowance signal information and the attenuation amount.

(8)

The wireless communication device according to (6) or (7), in which the attenuation amount is estimated on a basis of a distance between the self-device and the first destination wireless communication device, and the distance is estimated on the basis of the information obtained in the reception of the PHY header.

(9)

The wireless communication device according to (8), in which the distance includes a difference between a distance between the first wireless communication device and the first destination wireless communication device and a distance between the self-device and the first wireless communication device.

(10)

The wireless communication device according to (8) or (9), in which, in a case in which a signal is not received from the first destination wireless communication device, the distance includes a distance between the first wireless communication device and the first destination wireless communication device.

(11)

The wireless communication device according to any one of (8) to (10), in which, in a case in which a signal is received from the first destination wireless communication device, the distance includes the distance between the self-device and the first destination wireless communication device which is estimated on a basis of reception of the signal from the first destination wireless communication device.

(12)

The wireless communication device according to any one of (6) to (11), in which the information obtained in the reception of the PHY header and used to control the transmission power includes at least one of the modulation scheme information, transmission power information, and the allowance signal information included in the PHY header and reception signal strength in regard to the PHY header.

(13)

The wireless communication device according to any one of (6) to (12), in which, in a case in which transmission power requested from a second destination wireless communication device which is a destination of a signal that the self-device is to transmit is equal to or less than the transmission power decided by the control unit, the communication unit transmits the signal with the requested transmission power.

(14)

The wireless communication device according to (13), in which transmission of the signal with the requested transmission power includes transmission of a signal during a transmission stop time set in reception of a signal from the first wireless communication device.

(15)

A wireless communication device including:

a communication unit configured to transmit a physical layer (PHY) header including modulation scheme information, the PHY header being used to control transmission power in a second wireless communication device belonging to a second wireless communication network different from a first wireless communication network to which a self-device belongs.

(16)

A wireless communication device including:

a communication unit configured to transmit a signal including modulation scheme information, the signal being used to control transmission power in a second wireless communication device belonging to a second wireless communication network different from a first wireless communication network to which a self-device belongs.

(17)

A wireless communication method including:

receiving, by a communication unit, a physical layer (PHY) header including modulation scheme information from a first wireless communication device belonging to a first wireless communication network different from a second wireless communication network to which a self-device belongs; and controlling, by a control unit, transmission power on a basis of information obtained in reception of the PHY header.

REFERENCE SIGNS LIST

100 AP
110, 210 data processing unit
120, 220 wireless communication unit
130, 230 control unit
140, 240 storage unit
200 STA

The invention claimed is:

1. A wireless communication device comprising:
circuitry configured to
receive a physical layer (PHY) header including modulation scheme information from a first wireless communication device belonging to a first wireless communication network different from a second wireless communication network to which a self-device belongs, and
control transmission power on a basis of information obtained in reception of the PHY header, wherein
the PHY header includes allowance signal information in which allowance of another signal for signal reception in a first destination wireless communication device which is a destination of a frame subsequent to the PHY header is specified.

2. The wireless communication device according to claim 1, wherein
the PHY header includes an identifier of a wireless communication network.

3. The wireless communication device according to claim 1, wherein
the PHY header includes transmission power information in which transmission power of the first wireless communication device is specified.

4. The wireless communication device according to claim 1, wherein
the allowance of the another signal for the signal reception includes a degree of interference by the another signal to be allowed or a degree of reception power of the other signal to be allowed.

5. The wireless communication device according to claim 1, wherein
the circuitry is configured to decide transmission power on a basis of an attenuation amount of radio waves related to a signal that the self-device is to transmit, and
the attenuation amount is estimated on the basis of the information obtained in the reception of the PHY header.

6. The wireless communication device according to claim 5, wherein
the circuitry is configured to decide the transmission power on a basis of the allowance signal information and the attenuation amount.

7. The wireless communication device according to claim 5, wherein
the attenuation amount is estimated on a basis of a distance between the self-device and the first destination wireless communication device, and
the distance is estimated on the basis of the information obtained in the reception of the PHY header.

8. The wireless communication device according to claim 7, wherein
the distance includes a difference between a distance between the first wireless communication device and the first destination wireless communication device and a distance between the self-device and the first wireless communication device.

9. The wireless communication device according to claim 7, wherein,
in a case in which a signal is not received from the first destination wireless communication device, the distance includes a distance between the first wireless communication device and the first destination wireless communication device.

10. The wireless communication device according to claim 7, wherein,
in a case in which a signal is received from the first destination wireless communication device, the distance includes the distance between the self-device and the first destination wireless communication device which is estimated on a basis of reception of the signal from the first destination wireless communication device.

11. The wireless communication device according to claim 5, wherein
the information obtained in the reception of the PHY header and used to control the transmission power includes at least one of the modulation scheme information, transmission power information, and the allowance signal information included in the PHY header and reception signal strength in regard to the PHY header.

12. The wireless communication device according to claim 5, wherein,
in a case in which transmission power requested from a second destination wireless communication device which is a destination of a signal that the self-device is to transmit is equal to or less than the transmission power decided by the circuitry, the circuitry transmits the signal with the requested transmission power.

13. The wireless communication device according to claim 12, wherein
transmission of the signal with the requested transmission power includes transmission of a signal during a transmission stop time set in reception of a signal from the first wireless communication device.

14. A wireless communication device comprising:
circuitry configured to
transmit a physical layer (PHY) header including modulation scheme information, the PHY header being used to control transmission power in a second wireless communication device belonging to a second wireless communication network different from a first wireless communication network to which a self-device belongs, and
include in the PHY header allowance signal information in which allowance of another signal for signal reception in a first destination wireless communication device which is a destination of a frame subsequent to the PHY header is specified.

15. A wireless communication method comprising:
receiving, at a receiver, a physical layer (PHY) header including modulation scheme information from a first wireless communication device belonging to a first wireless communication network different from a second wireless communication network to which a self-device belongs; and
controlling, with circuitry, transmission power on a basis of information obtained in reception of the PHY header, wherein
the PHY header includes allowance signal information which allowance of another signal for signal reception in a first destination wireless communication device which is a destination of a frame subsequent to the PHY header is specified.

\* \* \* \* \*